(12) United States Patent
Casey et al.

(10) Patent No.: US 10,666,677 B2
(45) Date of Patent: May 26, 2020

(54) SYSTEM, METHOD AND COMPUTER-ACCESSIBLE MEDIUM FOR DETERRENCE OF MALWARE

(71) Applicant: New York University, New York, NY (US)

(72) Inventors: Will Casey, Columbia, MI (US); Bhubaneswar Mishra, Great Neck, NY (US)

(73) Assignees: New York University, New York, NY (US); Carnegie Mellon University, Pittsburgh, PA (US)

( * ) Notice: Subject to any disclaimer, the term of this patent is extended or adjusted under 35 U.S.C. 154(b) by 386 days.

(21) Appl. No.: 14/862,808

(22) Filed: Sep. 23, 2015

(65) Prior Publication Data

US 2016/0088012 A1 Mar. 24, 2016

Related U.S. Application Data

(60) Provisional application No. 62/054,055, filed on Sep. 23, 2014, provisional application No. 61/881,186, filed on Sep. 23, 2013, provisional application No. 61/890,697, filed on Oct. 14, 2013.

(51) Int. Cl.
*H04L 29/06* (2006.01)
*H04L 9/32* (2006.01)
*H04L 9/00* (2006.01)

(52) U.S. Cl.
CPC ........ *H04L 63/1441* (2013.01); *H04L 9/3271* (2013.01); *H04L 9/002* (2013.01)

(58) Field of Classification Search
CPC .... H04L 63/1441; H04L 9/3271; H04L 9/002
See application file for complete search history.

(56) References Cited

U.S. PATENT DOCUMENTS

| | | | | |
|---|---|---|---|---|
| 7,437,759 | B1* | 10/2008 | Szor ........................ | G06F 21/52 713/164 |
| 8,561,167 | B2* | 10/2013 | Alperovitch .......... | H04L 63/168 709/223 |
| 8,615,801 | B2* | 12/2013 | Cross ...................... | G06F 21/57 713/176 |
| 2006/0015942 | A1* | 1/2006 | Judge ...................... | H04L 51/12 726/24 |

OTHER PUBLICATIONS

M. Kassner, "Android flashlight app tracks users via GPS, FTC says hold on," Tech Republic—Security, pp. 1-6, 2013.
W. Casey, et al., "Cyber security via signaling games: Toward . . . cyber security," in ICDCIT, ser. Lect Notes in Comp. Sci., R. Natarajan, Ed. vol. 8337, Springer, pp. 1-10, 2014.

(Continued)

*Primary Examiner* — Wasika Nipa
(74) *Attorney, Agent, or Firm* — Hunton Andrews Kurth LLP

(57) ABSTRACT

An exemplary system method, and computer-accessible medium for initiating a protocol(s) can be provided, which can include, for example, generating a digitally encrypted perishable object(s), distributing the digitally encrypted perishable object(s) to a cyber-physical entity(s), determining if the cyber-physical entity(s) has received the digitally encrypted perishable object(s), and initiating at a predetermined protocol(s) based on the determination.

16 Claims, 18 Drawing Sheets

(56) References Cited

OTHER PUBLICATIONS

J. Mitre, "Science of Cyber-security". The Mitre Corporation, 2010.
M. R. Clarkson and F. B. Schneider, "Hyperproperties," Journal of Computer Security, vol. 18, No. 6, pp. 1157-1210, 2010.
R. Moskovitch, et al., "Unknown malcode detection via text categorization and the imbalance problem," in ISI. IEEE, pp. 156-161, 2008.
R. Tian, et al., "Differentiating malware from cleanware using behavioural analysis," in 5th Int'l Conf on Malicious and Unwanted Software: IEEE, pp. 23-30, 2010.
V. Moonsamy, et al., "Feature reduction to speed up malware classification," in Proc of the 16th Nordic Conf on Info Security Tech for Appl, ser. NordSec'11. pp. 176-188, 2012.
E. Gandotra.et al, "Malware analysis and classification: A survey," Journal of Information Security, vol. 2014, No. 5, pp. 56-64, 2014.
J. R. Quinlan, "Induction of decision trees," Machine Learning, vol. 1, No. 81, pp. 81-106, 1986.
L. Breiman, "Random forests," Machine teaming, vol. 45, No. 1, pp. 5-32, 2001.
C. Luk, et al., "Pin: building customized program analysis tools with dynamic instrumentation," ACM Sigplan Notices, vol. 40, No. 6, pp. 190-200, 2005.
H. Nayyar and P. Bueno, "Clash of the Titans: ZeuS v SpyEye," GIAC (GREM) Gold Certification, 2010.
T. Ormerod, et al., "Defaming botnet toolkits: A bottom-up approach to mitigating the threat," IEEE Computer Society, pp. 195-200, 2010.
H. Binsalleeh, et al, "On the analysis of the zeus botnet crimeware toolkit," in PST, pp. 31-38, 2010.
N. Falliere, "Windows anti-debug reference," Retrieved, vol. 1, pp. 1-10, 2007.
W. Casey and A. Shehnire, "Signature Limits: An Entire Map of Clone Features and their Discovery in Nearly Linear Time," ArXiv e-prims, 2014.
Contagio, "AlienSpy Java RAT Samples and Traffic Information" Contagio Malware Dump, pp. 1, 2014.
M. Hall, et al. "The weka data mining software: An update," SJGKDD Explor. Newsl., vol. 2, No. 1, pp. 10-18, 2009.
Mohaisen, Abedelaziz et al., "Unveiling Zeus: Automated Classification of Malware Samples," In Proceedings of the 22nd International Conference on World Wide Web Companion. Ser. WWW '13 Companion. Republic and Canton of Geneva, Switzerland: International World Wide Web Conferences Steering Committee, 2013, pp. 829-832, [Retrieved from the Internet], <http://dl.acm.org/citation.cfm?id=2487788.2488056>.
Hastie, Trevor et al., "The Elements of Statistical Learning: Data Mining, Inference and Prediction," 2nd Ed., Springer, 2009. [Retrieved from the Internet], <http://www-stat.stanford.edu/tibs/ElemStat Learn/>.
Quinlan, J. Ross, "C4.5: Programs for Machine Learning," Morgan Kaufmann Publishers, vol. 1, pp. 1-309, 1993.

\* cited by examiner

Figure 1

```
0x12f830 [0x12c] RETURN: RtlLeaveCriticalSection        0
0x12f830 [0x12c] RETURN: LdrLoadDll       0x242268
0x12fae0 [0x12c] RETURN: LdrLoadDll       0
0x12fae0 [0x12c] RETURN: RtlDeleteTimer 0
0x12fae0 [0x12c] RETURN: RtlFindMessage 0
0x12fae0 [0x12c] RETURN: RtlDeleteAce    0
0x12faec [0x12c] CALL: LdrUnlockLoaderLock (00000001,012C0004)
0x12fab8 [0x12c] CALL: RtlLeaveCriticalSection (7C978178)
0x12fab8 [0x12c] RETURN: RtlLeaveCriticalSection        0
0x12faec [0x12c] RETURN: LdrUnlockLoaderLock    0
```

Figure 6A $$C_{zeus} = v_{180} \cup v_{179} \cup v_{177} \cup v_{174} \cup v_{170} \cup$$
$$v_{168} \cup v_{164} \cup v_{161} \cup v_{157} \cup v_{155} \cup$$
$$v_{154} \cup v_{153} \cup v_{152} \cup v_{150} \cup v_{146} \cup$$
$$v_{141} \cup v_{138} \cup v_{136} \cup v_{133} \cup v_{130} \cup$$
$$v_{129} \cup v_{120} \cup v_{118} \cup v_{110} \cup v_{109} \cup$$
$$v_{108} \cup v_{106} \cup v_{102} \cup v_{89} \cup v_{86} \cup$$
$$v_{82} \cup v_{78} \cup v_{75} \cup v_{72} \cup v_{66} \cup$$
$$v_{64} \cup v_{59} \cup v_{58} \cup v_{53} \cup v_{50} \cup$$
$$v_{41} \cup v_{40} \cup v_{36} \cup v_{32} \cup v_{28}$$

zeus

Figure 6B $$C_{baseline} = v_{178} \cup v_{175} \cup v_{172} \cup v_{171} \cup v_{165} \cup$$
$$v_{163} \cup v_{158} \cup v_{151} \cup v_{148} \cup v_{147}$$
$$\cup v_{143} \cup v_{142} \cup v_{140} \cup v_{135} \cup v_{132} \cup$$
$$v_{131} \cup v_{128} \cup v_{122} \cup v_{121} \cup v_{119} \cup$$
$$v_{113} \cup v_{107} \cup v_{104} \cup v_{101} \cup v_{88} \cup$$
$$v_{85} \cup v_{83} \cup v_{81} \cup v_{77} \cup v_{74} \cup$$
$$v_{73} \cup v_{71} \cup v_{65} \cup v_{62} \cup v_{57} \cup$$
$$v_{54} \cup v_{51} \cup v_{48} \cup v_{46} \cup v_{39} \cup$$
$$v_{35} \cup v_{33} \cup v_{31} \cup v_{27} \cup v_{25} \cup v_{23}$$

baseline $v_1 = (\pi_{NtFreeVirtualMemory, RtlInitString} \leq 0)$ $v_2 = v_1 \cap (\pi_{NtSetInformationThread, NtQueryVirtualMemory} \leq 0)$ $v_3 = v_2 \cap (\pi_{RtlLeaveCriticalSection, RtlOemStringToUnicodeString} \leq 0)$ $v_4 = v_3 \cap (\pi_{RtlInitUnicodeString, RtlQueryRegistryValues} \leq 0)$ $v_5 = v_4 \cap (\pi_{NtSetInformationThread, RtlGetNtProductType} \leq 0)$ $v_6 = v_5 \cap (\pi_{NtAllocateVirtualMemory, RtlInitString} \leq 0)$ $v_7 = v_6 \cap (\pi_{NtSetInformationThread, NtProtectVirtualMemory} \leq 0)$ $v_8 = v_7 \cap (\pi_{NtSetInformationThread, RtlUnicodeToMultiByteSize} \leq 0)$

Figure 6C variable definitions $v_1, \ldots, v_{18}$ $v_{173} = v_3 \cap (\pi_{RtlInitUnicodeString, RtlQueryRegistryValues} > 0)$ $v_{174} = v_{173} \cap (\pi_{RtlCompactHeap, RtlFindMessage} \leq 6)$ $v_{175} = v_{173} \cap (\pi_{RtlCompactHeap, RtlFindMessage} > 6)$ $v_{176} = v_2 \cap (\pi_{RtlLeaveCriticalSection, RtlOemStringToUnicodeString} > 0)$

Figure 6D $v_{177} = v_{176} \cap (f^+_{NtQueryInformationJobObject} \leq 0)$ $v_{178} = v_{176} \cap (f^+_{NtQueryInformationJobObject} > 0)$ $v_{179} = v_1 \cap (\pi_{NtSetInformationThread, NtQueryVirtualMemory} > 0)$ $v_{180} = (\pi_{NtFreeVirtualMemory, RtlInitString} > 0)$ variable definitions $v_{173}, \ldots, v_{180}$

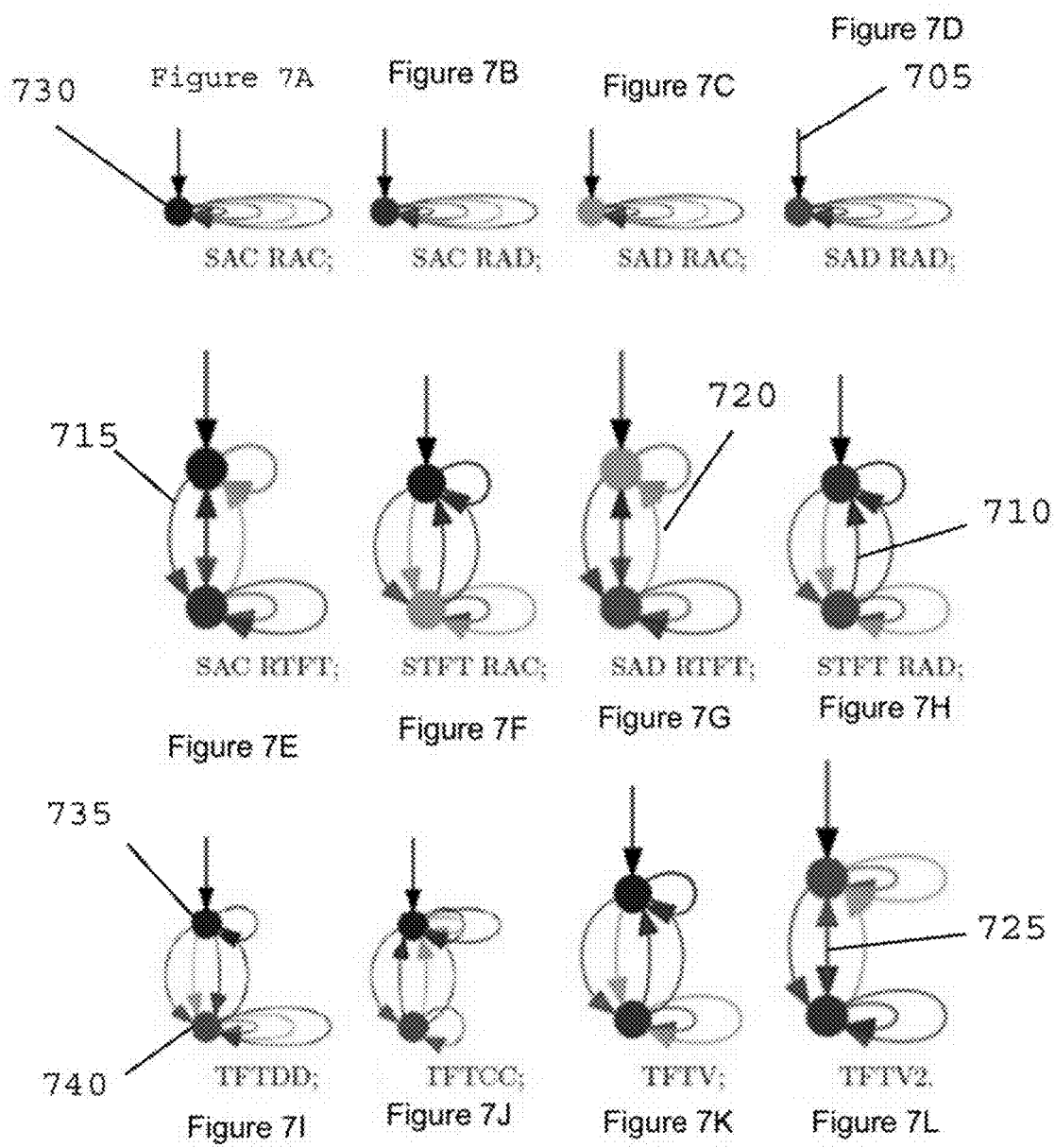

Figure 8A
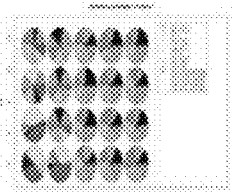
1111
Figure 8B
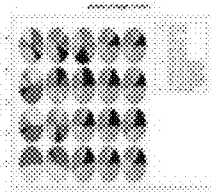
1118
Figure 8C
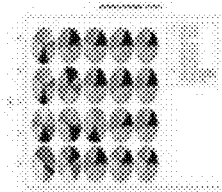
1811
Figure 8D
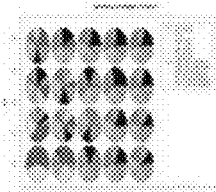
1818
Figure 8E
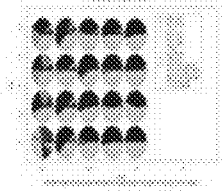
1181
Figure 8F
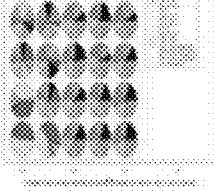
1188
Figure 8G
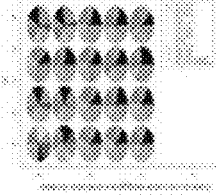
1881
Figure 8H
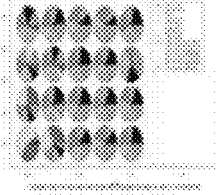
1888
Figure 8I
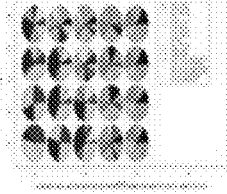
8111
Figure 8J
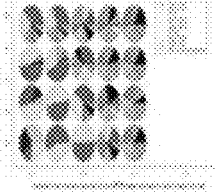
8118
Figure 8K
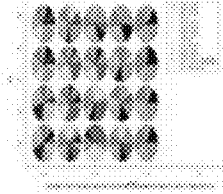
8811
Figure 8L
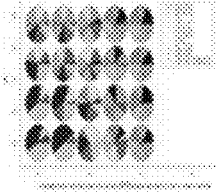
8818
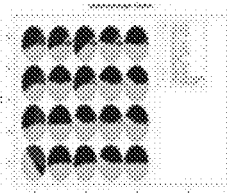
8181
Figure 8M
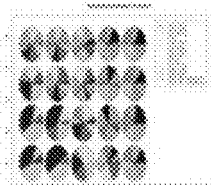
8188
Figure 8N
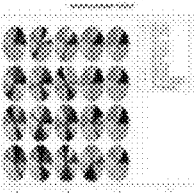
8881
Figure 8O
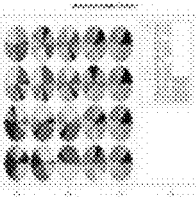
8888
Figure 8P

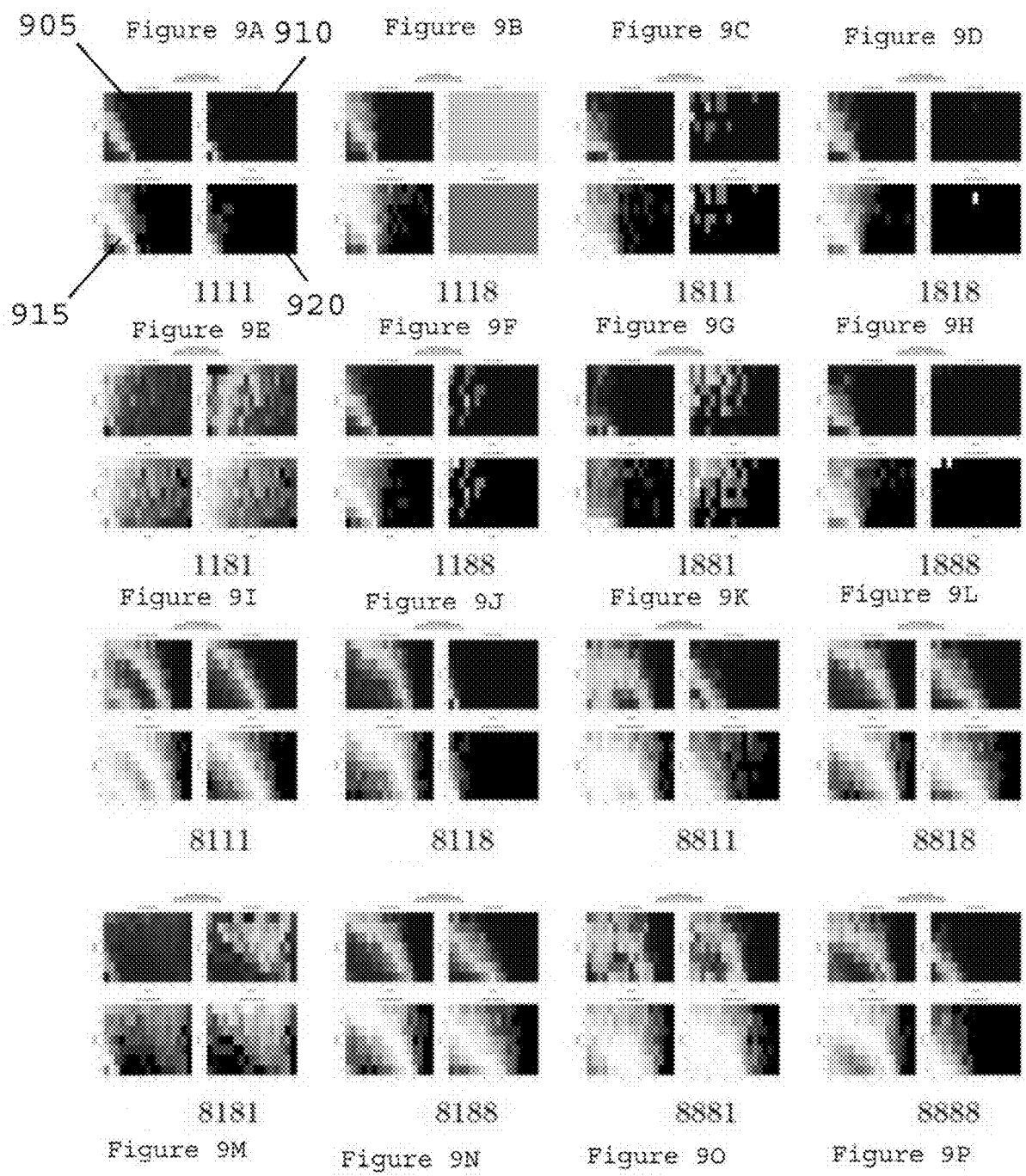

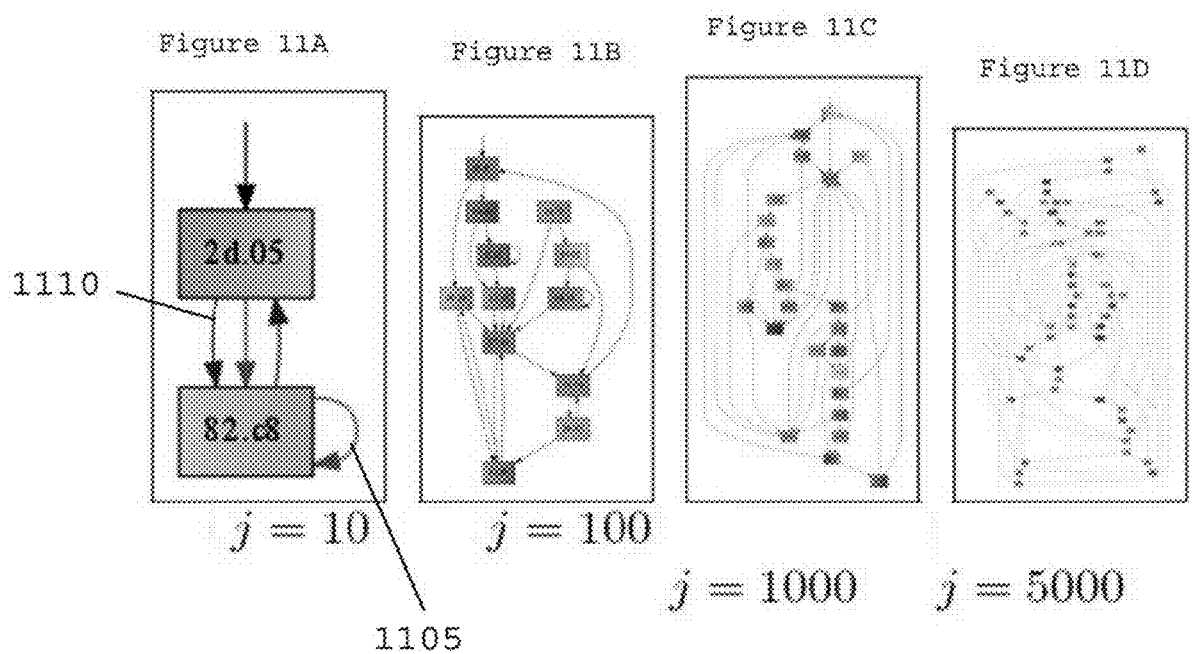

Figure 12A
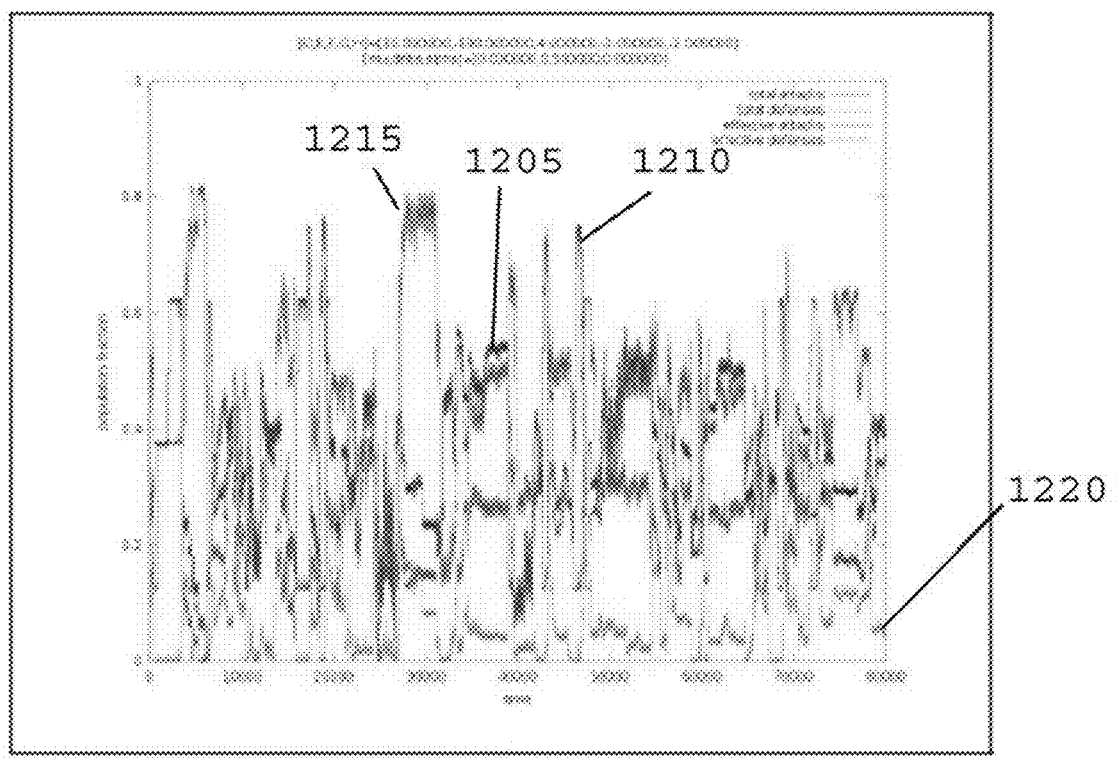
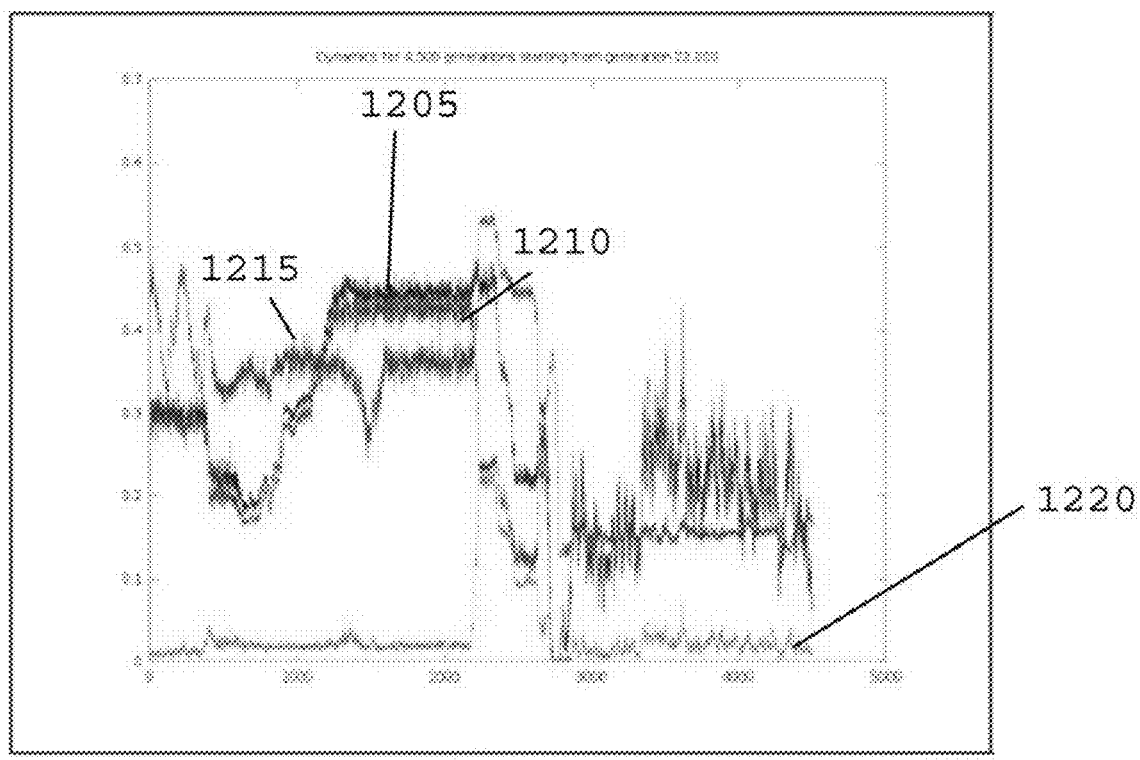
Figure 12B

Figure 14A
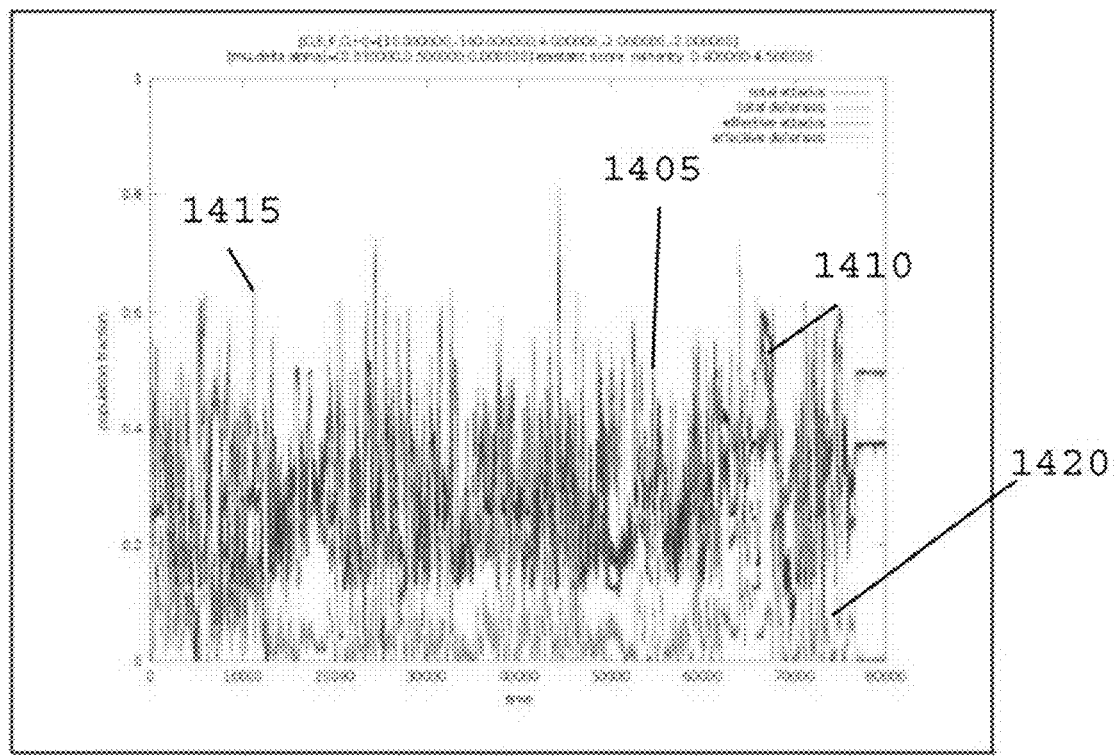
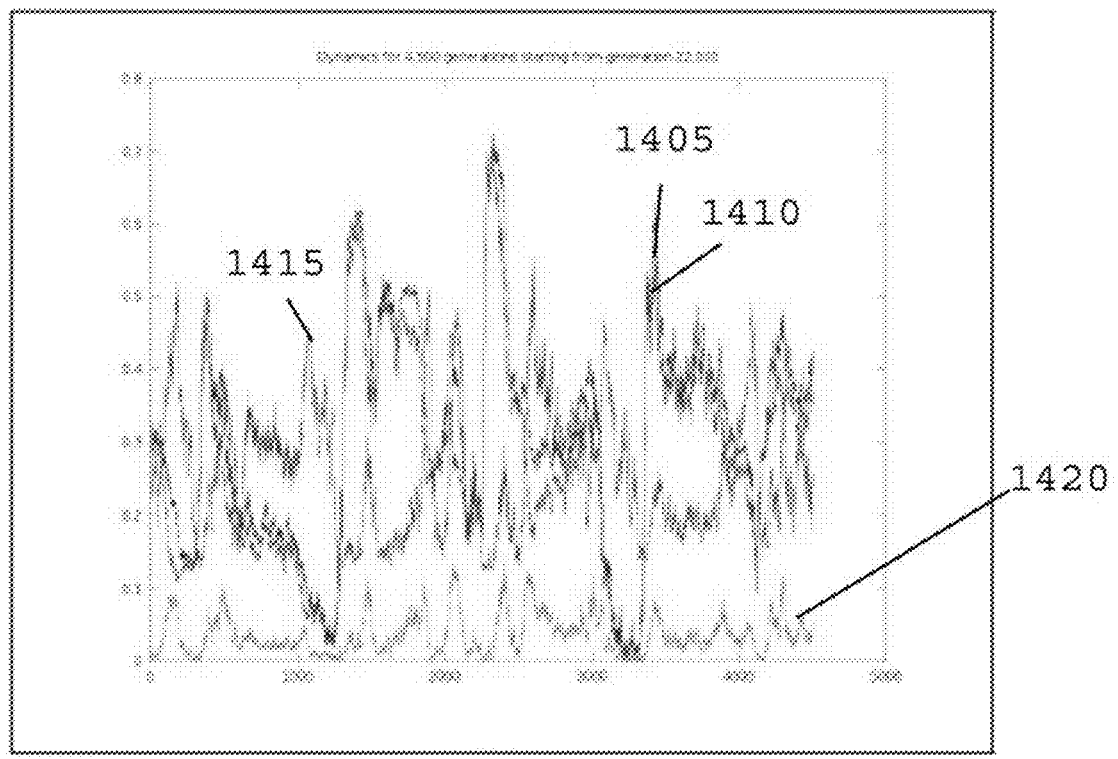
Figure 14B

SYSTEM, METHOD AND COMPUTER-ACCESSIBLE MEDIUM FOR DETERRENCE OF MALWARE

CROSS-REFERENCE TO RELATED APPLICATIONS

This application relates to and claims priority from U.S. Patent Application No. 62/054,055, filed on Sep. 23, 2014, the entire disclosure of which is incorporated herein by reference.

STATEMENT REGARDING FEDERALLY SPONSORED RESEARCH

This invention was made with government support under Grant No. FA8721-05-C-0003, awarded by the United States Air Force. The government has certain rights in the invention.

FIELD OF THE DISCLOSURE

The present disclosure relates generally to malware deterrence and identification, and more specifically to exemplary embodiments of systems, methods and computer-accessible mediums for facilitating the deterrence malware.

BACKGROUND INFORMATION

Current trends in technology point to increasing ubiquity of "social-network" and "application" centric frameworks. While these trends have dramatic security implications, which highlight the need to detect deceptive behaviors, it can also underscore the importance of developing new methods for malware detection and deterrence.

One of the problems facing the agents of a social-technological network can be to identify and classify the various forms of deception and attacks in traces executed on end point devices. Just as attackers can employ deception to achieve an attack (e.g., a benign sounding flash light app that actually opens a back door on the end point device to surveil the device's GPS coordinates, (see, e.g., Reference 1)), a defensive user can also check and validate that an app abides by a specific system security property, such as non-surveillance, which could be validated on the end point device by use of a trace monitor. The transactions in social-technological networks embody many such repeated games, with payoffs and costs, as in the previous example in which the sender of the flash light app receives the benefit of asymmetric information relative to each receiving agent (e.g., each end point device which installed the flash light app). The receiver can incur a cost through both the loss of privacy, and unawareness of the asymmetric information exploited by the sender.

Technical approaches toward attaining cyber security have created pressure on malware attackers to evolve technical sophistication and harden attacks with increased precision, including socially engineered malware, and distributed denial of service ("DDoS") attacks. A general and simple design for achieving cyber security remains elusive, and addressing the problem of malware has become such an important task, that technological, economic and social forces are needed to address this problem.

For example, in March of 2013, an attacker issued a DDoS attack that was so massive, it slowed internet speeds around the globe. Known as Spamhaus/Cyberbunker, this attack clogged servers with dummy internet traffic at a rate of about 300 gigabits per second. By comparison, DDoS attacks against banks typically register only about 50 gigabits per second. The Spamhaus attack came 13 years after the publication of best practices on preventing DDoS attacks, and it was not an isolated event.

Recent figures indicate that cyber-attacks continue to rise. Research from the security firm Symantec indicates that in 2012, targeted cyber-attacks increased by 42 percent. In part, for example, existing technologies facilitate the role of attacker over the role of defender, since in this hide-and-seek game, the tricks to hide the attack are many, whereas the techniques to seek them are meager and resource intensive.

The feasibility of the recommendation-verification system opens the way to new defense mechanisms that can be scalable to populations of users in a social-technological network in the era of ubiquitous computing.

Behavior modeling of agent based populations in cyber-social systems via signaling games was previously introduced, (see, e.g., Reference 2); this was later extended to minority games with epistatic signaling. Both simulation studies can be used to understand how a recommendation-verification system can operate practically. In signaling games, the parameters of costs/payoffs were shown to have dramatic outcomes on expected system (e.g., of population of agents) behavior. Epistatic signaling games, where defense options consider a vast attack surface, can provide more realistic simulations, yet retain many of the dynamics discovered in signaling games. The system wide effects of an early adapter advantage was explored in the minority game variation. This facilitates the exploration of the effects of preferentially rewarding early challenging receivers who adapt effective defenses in response to an ongoing attack technique, an important condition for any system that provides incentives for challenges to adapt (e.g., via mutation or other means) to novel attacks. Further exploration investigated the use of strong and transparent metrics for scoring security challenges (e.g., properties), and how this can lead to a more effective population wide response to emerging attacks. While the simulation studies address population behavior and dynamics, the question of how to implement such a system remained open, and it can be demonstrated how to challenge options for a recommendation-verification system could be realized with a methodology that learns the properties of traces from a particular malicious code family Zeus/Zbot (referred to as Zeus).

Formal methods including model checking, properties (e.g., as sets of traces) and hyper-properties (e.g., as sets of properties), can be referenced as ways forward to address the growing problem of malware and cyber security in today's ecology of computing. (See e.g., Reference 3). Hyper properties can also be used as a potential means to formally describe attack behavior and malicious use cases. Hyper properties can be shown (see e.g., Reference 4) to compactly describe security properties, such as non-interference, where a guarantee can be described as a hyper property. Such challenge options could be realized on end point devices by the use of trace monitors. To facilitate the needs of recommendation-verification, detectors (e.g., challenge options) can be described in a formal and standard way that can also be human interpretable. Therefore, hyper properties can be an ideal format.

The use of machine learning in the area of cyber security can be prevalent. (See, e.g., References 5-8). In this exemplary approach, machine learning methods can be used which can produce interpretable models (see, e.g., References 10 and 11), which develops procedures for inducing a simple and interpretable model from structured features (see, e.g., Reference 12) for boosting a classifier by combining an ensemble of weaker learners, and for ensemble boosting for interpretable decision trees. (See, e.g., Reference 13).

The exemplary technique illustrated on Zeus can be related in subject to previous work (see, e.g., Reference 7), which confines the learning objectives to features obtained from traditional runtime behavioral observations. A trace based approach can be pursued, which can construct an analogous analysis technique, but can limit the feature space to API count profiles, and stop short of measuring critical performance metrics (e.g., including model complexity) which would be utilized in a distributed recommendation-verification system. (See, e.g., Reference 6). The learning objective can be extended from the feature space of API count profiles to a feature space that includes primitive features (e.g., k-mers) of local ordering (e.g., of function call sequences), and the outcome suggests that this extension can lead to more concise and low complexity models. It can be further shown how to translate the results to a formal property, which could be deployed in a federated response.

By revisiting the problem of machine learning malware families from trace data, an immediate and promising possibility for development of receiver challenges in a practical recommendation-verification system can be explored.

A previous publication has pointed out that "[t]he need to secure computational infrastructure has become significant in all areas including those of relevance to the DoD and the intelligence community. (See e.g., Reference 3). Owing to the level of interconnection and interdependency of modern computing systems, the possibility exists that critical functions can be seriously degraded by exploiting security flaws. However, while the level of effort expended in securing networks and computers can be significant, current approaches in this area overly rely on empiricism and can be viewed to have had only limited success." The following rationale was offered: the challenge in defining a science of cyber-security derives from the peculiar aspects of the field. The "universe" of cyber-security can be an artificially constructed environment that can be only weakly tied to the physical universe.

Thus, the difficulty in developing a science of cyber security ("SCS") can be thought to stem from its inherent Manicheanness, where the adversary can be strategic and utilitarian, as opposed to being oblivious and stochastic (e.g., Augustine). (See e.g., Reference 3). However, it must also be noted that a significant fragment of a SCS has to be built upon a complex computational infrastructure that can be amenable to reasoning and re-engineering based on logical models, such as Kripke structures. Thus, it appears that a successful approach to the cyber security problem can come from an amalgamation of a dualistic approach, which can be partly based on techniques from game theory (e.g., inspired and validated with the tools of systems biology, (e.g., analysis of immune systems) and partly based on model building (e.g., machine learning and statistical inference) and model checking. In light of this discussion, it can be worth re-examining the strategic choices that entities such as SPAMHAUS and CYBERBUNKER made, despite the obvious fact that both parties must have been well-informed about the accepted norms and best practices that were incorporated in the hardware, software and protocol architectures; divorced from a model of the humans and the utilities they wished to derive from their strategic choices, the protocols, practices and norms achieved precious little.

Cyber security can be thought of in terms of classical Information-Asymmetry Games (e.g., also called Signaling Games) (see, e.g., Reference 3), where the players (e.g., agents) can assume either a role of a sender ("S") or that of a receiver ("T"). The sender can have a certain type, t, for instance: beneficent (e.g., "C" for cooperator) or malicious (e.g., "D" for defector), which could be assumed to be given by nature. The sender can observe his own type while the receiver does not know the type of the sender. Based on his knowledge of his own type, the sender chooses to send a message from a set of possible messages M={m1, m2, m3, . . . , mj}; these messages can be complex, for instance, an offer of a mobile app with certain advertised utility and a price. The receiver can observe the message, but not the type of the sender, or the ability to fully verify the message. Then, the receiver can choose an action from a set of feasible actions A={a1, a2, a3, . . . , ak}; the receiver can be oblivious/trusting (e.g., C for cooperator) or vigilant/mistrustful (e.g., D for defector). For instance, the offer of a mobile app can be ignored, accepted, or verified and rejected, with a possibility of a reputation-labeling of the app, the sender or the app-store, etc. The two players can receive payoffs dependent on the sender's type, the message chosen by the sender and the action chosen by the receiver.

Because of the informational asymmetry, it can be possible for a sender to be deceptive, as can often be the case in the cyber context. Traditional techniques such as making the signaling somewhat "costly" for the sender can help, but must be engineered carefully, otherwise the very information-sharing capabilities of the cyber system can be seriously compromised. There have been proposals for a new internet architecture, new internet protocols and "bandwidth-as-price" mechanisms (see, e.g., References 1, 2, 4, 5, 7-9, 16, 18 and 19), but any such approach can burden the normal transactions with an unwelcome and unacceptably heavy overhead.

At the center of many dynamic online strategic interactions (e.g., in social-technological networks) can be simple information-asymmetric games. Each interaction among agents, exchanging digital messages or Apps, presents a chance that either party can employ deception, and gain advantages over the other. Take for example the flash-light App for smart-phones which was also discovered to open a GPS-tracking backdoor to gain private information by tracking the device's physical location. (See e.g., Reference 1). While the producer (e.g., sender) of the flash-light App can advertise (e.g., signal) that the application can be designed to provide a flashlight feature (e.g., for smart phones) the sender creates the deceptive impression of respecting the user's privacy as implied by the app's benign sounding name: "flash-light App." Typical user's expectations of privacy would proscribe the surveillance capabilities (e.g., physically tracking the user's device via GPS-tracking) and not foresee encroachment by an app that can be prima facie simple, benign and desirable. In this case (e.g., and others like it) a typical consumer (e.g., receiver) would recognize that they had been deceived upon discovery of the App's true scope of capabilities which include the GPS-tracking, and subsequent to the discovery of the deceptive attack, the receivers can label the sender as a miscreant, and tarnish their reputation with a negative ranking and comments sprinkled with such labels as "backdoor," "Trojan," or "Malware." The encounter, concluded before the discovery of the attack, has its costs and benefits, as the cost to the receiver can be the loss of privacy, and the benefit to the sender can be the ability to gain strategic informational advantages with unanticipated usages.

Thus, it may be beneficial to provide an exemplary system, method and computer-accessible medium that can overcome at least some of the deficiencies described herein above, and provide, for example, malware deterrence.

SUMMARY OF EXEMPLARY EMBODIMENTS

Exemplary system, method, and computer-accessible medium for initiating a protocol(s) can be provided, which can include, for example, generating a digitally encrypted perishable object(s), distributing the digitally encrypted perishable object(s) to a cyber-physical entity(s), determining if the cyber-physical entity(s) has received the digitally encrypted perishable object(s), and initiating at a predetermined protocol(s) based on the determination.

In some exemplary embodiments of the present disclosure, the digitally encrypted perishable object(s) can include a digital currency. The cyber-physical entity(s) can include a software provider. A digital product(s) can be received from the cyber-physical entity(s), which can be a software program. The digital product(s) can be determined to be malicious. The digitally encrypted perishable object(s) can be a plurality of digitally encrypted perishable objects, and a particular amount of the digitally encrypted perishable objects can be deducted from the cyber-physical entity(s) if the digital product(s) can be digitally determined to be malicious or determined to potentially be malicious.

In some exemplary embodiments of the present disclosure, the digitally encrypted perishable object(s) can be a plurality of digitally encrypted perishable objects, an indication that the digital product(s) can be determined to be malicious or determined to potentially be malicious can be received, and a particular amount of the digitally encrypted perishable objects can be deducted from the cyber-physical entity(s) based on the indication.

In some exemplary embodiments of the present disclosure, a digital product(s) can be received from the cyber-physical entity(s), it can be determined if the digital product(s) can be malicious or an indication that the digital product(s) can be malicious can be received, and the digitally encrypted perishable object(s) can be deducted from the cyber-physical(s) entity based on the determination or the receipt of the indication. The predetermined protocol(s) can cause the transmission of a digital product(s) over a network.

Another exemplary embodiment of the present disclosure can include an exemplary system, method and computer-accessible medium for initiating a protocol(s), which can include, for example, generating a digitally encrypted perishable object(s), distributing the digitally encrypted perishable object(s) to a cyber-physical entity(s), receiving a digital product(s) from the cyber-physical entity(s), determining if the digital product(s) can be malicious, deducting the digitally encrypted perishable object(s) from the cyber-physical entity if the at least one digital product is determined to be malicious, determining if the cyber-physical entity(s) has the digitally encrypted perishable object(s), and initiating a protocol(s) if the cyber-physical entity(s) still has the digitally encrypted perishable object(s).

These and other objects, features and advantages of the exemplary embodiments of the present disclosure will become apparent upon reading the following detailed description of the exemplary embodiments of the present disclosure, when taken in conjunction with the appended claims.

BRIEF DESCRIPTION OF THE DRAWINGS

Further objects, features and advantages of the present disclosure will become apparent from the following detailed description taken in conjunction with the accompanying Figures showing illustrative embodiments of the present disclosure, in which:

FIG. 1 is an exemplary diagram of an exemplary trace implementation according to an exemplary embodiment of the present disclosure;

FIGS. 6A-6D illustrate various properties for testing the exemplary system, method and computer-accessible medium according to an exemplary embodiment of the present disclosure;

FIGS. 7A-7L are exemplary diagrams illustrating game strategies according to an exemplary embodiment of the present disclosure;

FIGS. 8A-8P are exemplary diagrams illustrating mutation rates applied to populations according to an exemplary embodiment of the present disclosure;

FIG. 9A-9P are exemplary diagrams of aggregate population behaviors according to an exemplary embodiment of the present disclosure;

FIGS. 11A-11D are further exemplary diagrams illustrating a further exemplary signaling game according to an exemplary embodiment of the present disclosure;

FIG. 12A is an exemplary graph illustrating fractional quantities of attacks according to an exemplary embodiment of the present disclosure;

FIG. 12B is an exemplary graph illustrating higher resolution quantity attacks as compared to FIG. 12A according to an exemplary embodiment of the present disclosure;

FIG. 14A is an even further exemplary graph illustrating fractional quantities of attacks according to an exemplary embodiment of the present disclosure;

FIG. 14B is an exemplary graph illustrating higher resolution quantity attacks as compared to FIG. 14A according to an exemplary embodiment of the present disclosure;

Figure 2:
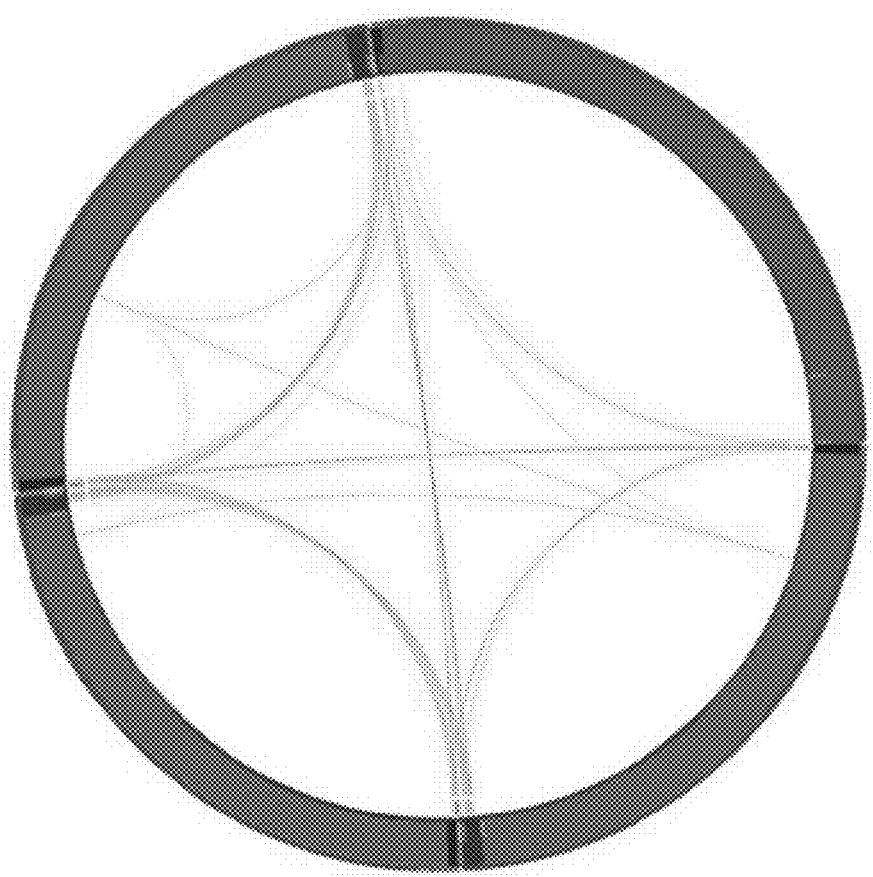
FIG. 2 is an exemplary diagram illustrating a polymorphism and obfuscation according to an exemplary embodiment of the present disclosure.
Figures 3A, 3B, 3C, 3D:
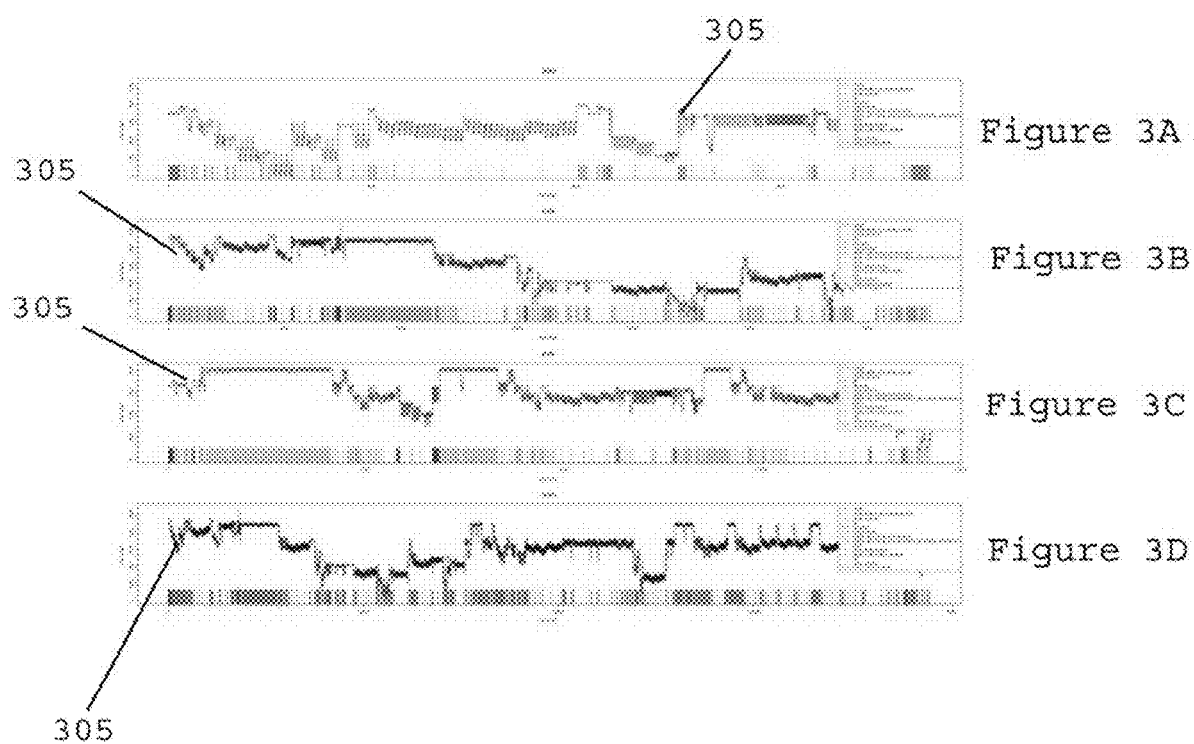
FIGS. 3A-3D are exemplary graphs illustrating traces of exemplary Zeus software according to an exemplary embodiment of the present disclosure.

Throughout the drawings, the same reference numerals and characters, unless otherwise stated, are used to denote like features, elements, components or portions of the illustrated embodiments. Moreover, while the present disclosure will now be described in detail with reference to the figures, it is done so in connection with the illustrative embodiments and is not limited by the particular embodiments illustrated in the figures or appended claims.

DETAILED DESCRIPTION OF EXEMPLARY EMBODIMENTS

Exemplary interactions can be modeled in a social-technological network as repeated signal games. To better understand the possible dynamics, a simulation system that tests the dynamic behavior of a population with access to a recommendation-verification system can be developed, which can suggest and score defense options to deter ongoing attacks. The recommendation-verification system can act as a trusted broker of security properties. For this purpose, it can be designed to facilitate populations to adapt to novel threats by providing equities for the development of effective defenses to ongoing attacks. Furthermore, the currency (e.g., digital currency) of such a system can be called M-coins certificates backing proofs concerning app behavior. (See, e.g., Reference 2).

An exemplary goal can be to show how machine (e.g., statistical) learning of trace features particular to a malware family could provide basic defense options specified as system properties to be implemented on end point devices. The needs of an exemplary recommendation-verification system offering defensive options to users can be: (i) options can be measured for effectiveness, (ii) options can be widely transitioned across a large number of end point devices via user recommendation or otherwise, (iii) options can be mutable by user agents, and (iv) user agents can hold a portfolio of mixed strategic options. To achieve mutability by user agents, which can be used to adapt to attack evolution, defensive options can be human interpretable, and low complexity, so that user agents can manipulate options in meaningful and strategic ways. In order for users to employ a mixed strategy, it can be important that the strategic options can be defined within the context of algebra. Thus, properties or hyper-properties can be suggested.

By reconsidering a well-known problem of machine learning traces, but in the context of a recommendation-verification systems, contributions can include:
  (i) Creating a practical use of properties and hyper properties which can be implemented on end point devices via a trace monitor,
  (ii) Showing the feasibility of the recommendation-verification system by meeting the needs for defense options.

The systems, methods and computer-accessible mediums, according to an exemplary embodiment of the present disclosure, can extend beyond a detection of strategic and deceptive actions of an attacker, for example, by reversing the very incentives that can ultimately make the choices made in hide-and-seek dynamics more transparent. Most attackers have incentives to find weaknesses in software, which can facilitate system compromise. These dynamics, however, can be reversed through an altered incentive structure, credible deterrence/threats and powerful measurement systems. For example, an incentive can be provided to evaluate software, and guarantee their validity, albeit empirically using techniques from machine learning. For example, such combination of exemplary techniques, including expert systems, model checking and machine learning, can facilitate an increased level of resilience without a loss of transparency. Moreover, for example, a game theory can provide a way to evaluate the dynamics of incentives, and to understand the impacts of new technologies and use cases.

Exemplary Deterrence of Malicious Use in Systems

Existing proposals for deterring malware attacks rely on the isolation of an elite network with enhanced security protocols, which can undermine the utility of networking, and can do little to deter incentives for maliciousness. Instead, an exemplary strategy can concentrate digital assets in one place, putting all "eggs" in one or more highly vulnerable "baskets". Such proposals, while costly and risky, underscore the importance of introducing alternative ideas into the discussion of common information assurance goals.

For example, since computer networks gather users with a variety of different interests and intents, it may be beneficial to incentivize computer users to take steps that will compel them to reassure other users that they have not been maliciously compromised. To obtain this assurance, the work of technical and security experts can be leveraged, which can involve sophisticated software vulnerably probing techniques (e.g., fuzz testing) and trust mechanisms (e.g., trusted hardware modules), etc. With these exemplary assurances, the possibility of economic incentives for software adopters to have deeper and clearer expectations about a network's resilience and security can be facilitated.

Exemplary Game Theory

Basic foundations of modern game theory studies show how rational agents can make strategic choices as they interact. An example of one such strategic choice can be the concept of mutual assured destruction ("MAD"), which describes a doctrine that a "war" in which two sides would annihilate each other would leave no incentive for either side to start the war. Once the two sides have come to such a mutually self-enforcing strategy, neither party would likely deviate as long as the opponent does not. Such state-of-affairs can be described in game-theory by the concept of Nash equilibrium. The cyber-security problem can be cast in a game-theoretic setting so that (i) every "player" will choose to be honest; (ii) every player will check that they can be honest and not an unwitting host for malware; and (iii) every player can prove to others that they can honest and accept confidently the proofs that others can be honest and not acting deceptively.

Building on deep domain knowledge from CERT about the nature and origin of malicious attacks, and how often those attacks occur, the exemplary systems, methods and computer-accessible mediums, according to an exemplary embodiment of the present disclosure, can provide a better understanding of the implications of such attacks in a larger system. The exemplary framework for this exemplary approach can be based on model checking.

For example, one exemplary task can be to provide one or more mathematical frameworks to describe vulnerabilities including attack surface, trace data, software errors and faults and malicious traces. An exemplary ability to rigorously define these patterns can facilitate the formalization and detection of a large class of malicious patterns as they transfer from user to user.

As an exemplary use-case, several critical patterns can be focused on to identify malicious behaviors in traces. By reviewing the Zeus Trojan horse, which was used to steal users' banking information, atomic actions can be identified that can facilitate malicious users to persist on a system, and compromise their web browsers.

The exemplary systems, methods and computer-accessible mediums, according to an exemplary embodiment of the present disclosure, can provide some degree of guaranteed resilience. When fully implemented, the exemplary systems, methods and computer-accessible mediums, according to an exemplary embodiment of the present disclosure, can provide benefits to government and industry including: (i) a well-understood exemplary model of interactions among benign and malicious users; (ii) a more accurate exemplary view of forces (e.g., technological, economic, political and social) that shape the security landscape; (iii) an exemplary scalable method for malware mitigation, including an adaptive system that can identify and address new threats; and (iv) a transparent exemplary mechanism to vet commercialized software, which relates to the notion of trusted computing at multiple levels, from firmware to Android applications.

Exemplary Measurements for Resilience to Malicious Attacks

The exemplary system, method and computer-accessible medium, according to an exemplary embodiment of the presented disclosure, can have various features including that it does not simply stop after identifying a network attack. Instead, it can motivate and facilitate a deployment of measures of weaknesses using practical techniques such as vulnerability assessments for servers, fuzz testing binaries for weaknesses and verifying adherence to best practice. These exemplary measures can provide decision makers, and users alike, with ways to adapt best practices, and keep the network operational. Consequently, exemplary system designers can also better understand what security features can be needed in response to current threats and attack methods. Many software vulnerabilities can result from implicit assumptions made at the time of design. While it may be difficult to anticipate all the attacks against a design, the time it takes for designers to respond to current attacks within the exemplary framework of measures can be estimated and minimized according to exemplary embodiments of the present disclosure.

The exemplary system, method and computer-accessible medium, according to an exemplary embodiment of the present disclosure, can deter malicious attackers, and can also motivate users to ensure that their computers and mobile devices have not been purposefully or unintentionally compromised. In addition, designers can benefit from adding in security as user demands for security can increase.

There is no widely accepted definition of what constitutes malicious behaviors stated in a way that can be understood and guarded against by average users. Thus, the exemplary system, method and computer-accessible medium, according to an exemplary embodiment of the present disclosure, can help users, and those in government and industry, to gain a better understanding of whether behavior can be malicious or benign.

A simpler concept used in the physical context can be trust. If trust can be perceived to be a valuable economic incentive in the cyber context, and users can assess whether they can trust a server or a software application, then a trust-based technique can be used, and can benefit a diverse group of users ranging from individual users to personnel in industry and government.

The exemplary approach can be powerful in trusted computing situations, where trust can be based on cryptographic signatures that can validate the source code that operates a device, even though complete certainty can be elusive. For example, users can entertain some assurance about the health of their network, because a third party can verify, and certify, that all components are trustworthy and are behaving well.

To verify the exemplary system, method and computer-accessible medium, an exemplary simulation can be performed in-silico, aimed at understanding the incentives to attack and counter attacks with mitigation, in order to better understand how the individuals strategize to select equilibrium (e.g., a strategy profile from which no single player can be incentivized to deviate). Using exemplary simulation modeling, the resource needs can be estimated, as well as the overheads and other needs of the system for practical deployments.

Exemplary Definitions

Let $\Sigma$ be a set of states. A trace can be any countable sequence over $\Sigma$. So, for example:

$$\sigma i \epsilon \Sigma \text{ for } i \epsilon S \text{ with } S \subset N.$$

In sequence notation, $\sigma i$ can denote the ith state in the trace sequence. Trace data in practice can be thought of as a finite sequence over a set of states. Trace sequences can express a program execution sequence with a wide variety of granularity specified by the states encoded as $\Sigma$. In the theoretical context, a trace a can be either finite ($\sigma \epsilon \Sigma^*$) or countably infinite ($\sigma \epsilon \Sigma^{N^0}$).

Exemplary Properties.

A property can be a set of traces. Properties can be further studied in a theoretical context where they can be categorized into types including safety properties which can be properties determined by the occurrence of critical and irredeemable events in finite time, and liveness properties which can be properties that for any finite trace they can be continued to form a member of the property. Hyper properties have been introduced (see, e.g., Reference 4) to derive more compact descriptions of security properties. For hyperproperties, the distinction between safety and liveness has been discussed, and a decomposition theorem has been shown. The decomposition theorem for properties states that any property can be described as the intersection (e.g., conjunction) of a safety property and a liveness property. The decomposition theorem can be proved using set systems over $\Sigma^*$ as the lower Vitoris topology. During the exemplary methodology properties, sets of traces can be the learning objective, and methods for computing properties can be shown, which can be indicative of Zeus malware.

Exemplary Developing Trace Data.

In the context of executable behavior, the states of $\Sigma$ can be the observable events associated with kernel functions expressed during runtime. A tracing technique, such as the exemplary technique above, can be considered, in the abstract, to be a mapping, taking as input a static binary executable b and running the binary in a monitor to produce a string over $\Sigma^*$. To denote the abstract mapping between binary executable and trace sequence, the function $\Phi$ can be introduced, which for every b, can be capable of producing a value $\Phi(b) \epsilon \Sigma^*$ in sequence space.

Exemplary Property Learning Using Trace Features.

To establish a starting position, a problem can be defined which can focus on learning a property (e.g., as a set of traces) from trace features. In this exemplary case, learning a property can be considered by observing trace objects for a specific malware family using supervised knowledge, meaning that at least part of the answer (e.g., of what constitutes the malware family) can be known a priori from other methods/means. The exemplary result can be a classifier, which can more compactly represent the property, or set of traces, than the set itself.

To be more precise, given as a set of traces T0 (e.g., constituting the behavior of a malware family), the problem of learning a classifier for T0 as a property from a background set of traces from other malware families T1, T2, ..., TK can be considered. Trace features can include any statistical profile of trace including epochs (e.g., k-mer substrings). The result can be a classifier that takes as input a trace, and can determine if the trace can be within the property T0.

Exemplary Methodology: API Scraping

Exemplary Design and Implementation.

API scraping can be a method for collecting trace date from an executable program. Trace data can be analyzed to gain an understanding of how an exemplary program behaves in a system. In general, API scraping can be the act of specifying and capturing the data used to gain understanding, of behavior and can be an art.

To implement API scraping, for example, a binary instrumentation can be used. Binary instrumentation is the process of instrumenting a running program with monitoring code to record or augment runtime events, such as function calls or data flow through a given function. Binary instrumentation can be designed to record massive amounts of data at the finest resolution of processor actions. However, due to the inherent trade-off between resolution and the resulting signal to noise ratio in recorded output, it can more often be designed to capture events that provide the most relevant information for understanding behavior. Therefore, rather than capture all data related to every possible action in the process, an exemplary technique for selectively and strategically instrumenting functions (e.g., often specified in an abstract programming interface or API) can be designed (e.g., called API scraping).

This exemplary technique can facilitate an arbitrary list of kernels, or otherwise accessible functions, to be specified for instrumentation. In general any function whose prototype can be discovered and loaded within an executable image can be listed for scraping by the exemplary technique. The results of facilitating the strategic selection of which functions to trace via API-Scraping can be higher signal to noise ratios in recovered traces (e.g., the functions called directly from the executable module and discarding nested or supporting API calls can be monitored), more complete coverage of binary behavior fluxing through a given API, and increased abilities to specialize tracing needs to specific threats. Complete coverage of the kernel space can be important when studying malware because even a determined adversary can be limited to the use of kernel function (e.g., however obscure), for accomplishing goals and tasks.

In the exemplary technique, capturing events that relate to system interaction can be examined by recording the events of functions (e.g., entry and exit) made by an instrumented program. The exemplary technique implementation can utilize the Intel Pin Binary Instrumentation Toolkit (see, e.g., Reference 14) for dynamic instrumentation, and can include a programmable pattern matching language. The exemplary technique selection of Intel Pin was because it provided the functionality needed to instrument an executable file at the function call level, its relative stability and its support for multiple platforms with a unified process model.

Tailoring API scraping for behavioral sequences.

Central to the design of the exemplary technique, an API scraping technique can be that the selection of what functions can be scraped can be entirely up to the validating agent. The selected list of function can be denoted as $F=\{y1, y2, \ldots, yM\}$, with each yi a specific function (e.g., from a system API listing). For each specified function, a monitor can be established in the process image that can produce a report for the entry event (e.g., occurring when the function can be called) and the exit event (e.g., occurring when the executing process returns control from the function to the caller).

The exemplary technique API-Scraping implementation for Windows XP, 7, and 8 operating systems is shown in FIG. 1. It utilizes the Intel Binary Instrumentation Toolkit ("PIN") and reports a sequence of kernel function API calls with the address of parameters and return values. S list of 527 Windows kernel level functions can be instrumented, therefore $|F|=527$. Of the instrumented functions, 283 can be Rtl functions, while 224 can be NT functions and 17 can be Ldr functions.

For a given listing of functions F, implemented in API scraping, the binary instrumentation can be denoted as a function: $\Phi F(b) \in \Sigma^*$, which can take as an input a binary executable b and produce a trace sequence $\Sigma^*$. In this exemplary setting, the elements of $\Sigma$ can be limited to function and the action type (e.g., entry or exit), and for now the other recorded fields can be ignored.

Deception, Polymorphism and Zeus Traces.

In the context of a social-technological network, it can be important to recognize that implementing polymorphic techniques (e.g., to be deceptive) can come at a fixed cost to the malware designer, and can dramatically increase the difficulty and cost of agent based checking (e.g., detection, classification, or signature generation). For this reason, and to demonstrate the difficulties that a polymorphic attack family can present, the Zeus botnet crime ware (see, e.g., References 15-17) can be considered, which can be primarily designed to go undetected via polymorphism, establish system persistence, infect web browser to achieve a man in the app attack, facilitating the operator to intercept/counterfeit web traffic usually to electronic banking sites. Using Zeus, the distinction between the efforts to developing static signatures versus that of considering behavior sequence from trace data can also be demonstrated.

Because the Zeus family can be a sophisticated threat employing both deception (e.g., obfuscation) and anti-analysis techniques, it can be an ideal test subject for the methodology of learning properties (e.g., for a difficult and polymorphic case), and can show how the result can be utilized in a recommendation-verification system by codifying the detection as a property. The Zeus malware family can be known to be polymorphic (e.g., employing several layers of obfuscation) and implements anti-debugging techniques. (See, e.g., References 15 and 18). Polymorphic techniques employed by a malware family such as Zeus, increase the difficulty of static analysis by degrading or obfuscating the signals that individual elements of the family can be in fact related, at least from the perspective of their executable images as stored on disk. Yet while the Zeus malware family can be polymorphic, it may not be considered to be metamorphic, so analysis of behavior sequences in trace data can lead to the discovery of invariants across all the elements of the family.

Below illustrates that the exemplary Zeus malware samples can be polymorphic but not metamorphic. The polymorphic identity can be illustrated by applying a clone mapping study to a control set, of binary executable images produced using the Zeus builder version 1.2.4.2, which reveals the high levels of code obfuscation viewable in FIG. 2. Using the same control set of binary images a visualization of API-Scraping can be provided by plotting the execution cursor over trace sequences in trace, and can suggest that patterns in trace can be simpler, albeit more involved using API scraping, to analyze and summarize for this case of Zeus and possibly other cases of polymorphism.

Indeed the exemplary technique results section shows that the behavioral sequences can admit compact descriptions as properties, which can be learnable by machine learning techniques and simple to state due to the relatively low complexity of the resulting classifiers. A discussion of the validity of the exemplary technique API-scraping methodology can be provided by showing critical actions of the Zeus binary process as recorded by the exemplary API-Scrapping method despite the documented anti-debugging techniques employed by the bots.

To obtain FIGS. 2 and 3A-3D, a control data set can be generated by starting with the Zeus 1.2.4.2 builder, and then feeding a single (e.g., constant) configuration script into the builder to create multiple bots.

FIG. 2 illustrates how these static images vary greatly. The exemplary technique can map all code-clones, or common byte sequences, found in a set of generated Zeus bots, and illustrate that there can be very little code similarity to discover. A finding from the code-clone analysis can be that a small sequence associated with the outer most unpacking function, which can be designed to look like a UPX style decoder, can be placed at a random position in the "text" section of the binary, and to prevent long matches of bytes sequences, greater than around 30 random bytes can be sprayed into the sequence. The builder can employ a technique that can randomize values as well as the location for the entry function to increase the difficulty and cost of creating signatures for the static images. The general problem of detecting the Zeus family can be made even more difficult because there can be multiple versions of Zeus beyond version 1.2.4.2.

FIGS. 3A-3D illustrate an exemplary execution pointer position as a function of time for four zbot products (e.g., configuration script held constant) to illustrate that there can be observable similarity in the trace functions 305. Associated with each y-position can be the execution pointer position plotted as a function of time x-axis, the execution position (e.g., for loaded kernel modules) can be correlated to linked functions expressed during runtime. Even though not all traces can record the same number of steps, or time interval, the similarity can be viewed with dilation and truncation options. In addition, FIGS. 3A-3D illustrate the sequence on the x-axis of each trace function. These sequences can help to calibrate one trace against another to see the similarities in trace.

Validity of API Scraping Methodology.

To test that the exemplary techniques used to derive the trace data can be non-interfering with the malicious sample (e.g., despite the anti-debugging techniques implemented), the Zeus binaries can be tested to achieve known characteristics of runtime. (See, e.g., References 15-17). Specifically, the Zeus binaries can be checked to identify a persistent running process, in each case winlogin and attach a secondary infection into initialization routines.

Exemplary Methodology: Learning Properties

With the exemplary API scraping techniques established, the following focuses on the overall problem of learning characteristics of trace in a given family of malware. This can be achieved by outlining the overall process to attain a classifier for a given malware family.

---

Given: $T_0$ A property (set of traces).
Process:
    Baseline: develop a stratified sampling over comparables (i.e. other properties as sets of traces from malware families). These properties whose union will be termed baseline will be denoted as $T_1 \cup T_2 \cup \ldots \cup T_K$.
    Compute: learn a classifier for property $T_0$ vs. baseline in terms of the sequential features of trace.
Output: A classifier specified in terms of a properties prescribing trace features of target family and proscribing features of baseline.

---

For version 1.2.4.2, this can be validated by checking for value C:/WINDOWS/system32/sdra64.exe appended to the key field Userinit for key Winlogon. Each bot traced can achieve these steps indicating that the technique of API scraping can be robust to the anti-debugging features of the malware family.

Given a computed classifier for T0, the intrinsic validation measures of the binary classifier can include:

Accuracy (e.g., holdout) using 10 fold cross validation.
Statistical power measures. True positive versus false positives, precision and recall.
Model complexity or description length of classifier.
Model interpretability.

Of the intrinsic validation measures, the complexity and interpretability can be of particular interest, which can make practical use of the defense properties in a recommendation-verification system.

Exemplary Data Set.

A set of about 1933 unique Zeus binaries labeled by the contagio web site were considered as a list of Zeus examples. To represent all other non-Zeus malware, a set of about 9620 malware samples chosen as a baseline were used. The baseline was chosen from a large corpus of manually labeled PE32 malware representing about 151 (e.g., K=151) distinct malware families, excluding Zeus. For each baseline family, a stratified sample additionally bound the maximum number from each family can be used to control for large families in the exemplary technique baseline dataset. Stratified sampling can be a sampling technique where the number of representatives of the kth family Tk can be proportional to $$\frac{|T_k|}{\sum_{i=0}^{K} |T_i|}$$

and therefore can be proportional to an underlying frequency based on the frequency of observed tagged artifacts within a corpus. For now, it can be assumed that the frequency of tags in the exemplary technique corpus of collected artifacts can correspond to underlying frequencies of artifact prevalence in the wild.

Exemplary Statistical learning.

With the data T0 set to the traces derived from the Zeus tagged, artifacts from contagio (see, e.g., Reference 20) and a background $T1 \cup \ldots T151$ established the problem of learning the distinguishing features of trace for T0 vs background can be returned to. Each trace $tx=\Phi F(x)$, obtained by applying the API-Scrapping with selected function set F to the binary executable image x, can be an ordered behavior sequence. With a given trace t held constant, three count vectors can be derived as features which can be grouped as detailed below.

Exemplary Function Expression Profile with the Following Properties:

Total count, for each function y, let $f+$ the count the totaling C4.5 to demonstrate the effect of Adaboost, a popular number of events (e.g., entry or exit events) for a given trace t. Balanced count: for each function y, let $f-$ be the difference (e.g., subtraction) of events (e.g., as number of exit events minus entry events) for function y for a given trace t.1.

Exemplary Function Transition Profile for k-mers with the Following Property:

Total count, for each contiguous subsequence of function events of length k as (y1, y2, . . . , yk) let $\pi$(y1, y2, . . . , yk), count the number of occurrences of this subsequence of events (e.g., regardless of whether the event can either be entry or exit) for a given trace t.

Although in the exemplary technique experiments k-mers can be limited to a size of k=2, and can represent the 2-grams, the exemplary technique easily extends to any number of transitional k-mers.

For each binary x, the following count feature vectors can be obtained from its trace tx:

$$\underline{f}^+(x) = \langle f_y^+ \rangle_{y \in F}$$

$$\underline{f}^-(x) = \langle f_y^- \rangle_{y \in F}$$

$$\underline{\pi}(x) = \langle \pi_{(y,z)} \rangle_{(y,z) \in F \times F}$$

Therefore, for a corpus of binaries xi N, the vectors can be derived as, for example:

$$\langle \underline{f}^+(x_i), \underline{f}^-(x_i), \underline{\pi}(x_i) \rangle_{i=1}^N$$

With these exemplary vectors (e.g., for the entire data set) in combination with family tagging (e.g., txi∈Tj which can indicate the supervised knowledge that binary i can be contained in family j), the supervised trace property-learning problem with stratified sampling can be considered. The supervised trace property-learning problem can be outlined as an exemplary procedure as follows:

---

Experiment:
 Training:
  Stratified Sample: for each k select a sub-sample of size 90% from $T_k$.
  Learn distinguishing trace features
  Test and Evaluate: Using the resulting model test on the larger set with

---

In the exemplary experiments, the use of these learning methods as implemented in the Weka framework can be explored. (See, e.g., Reference 21).

Naive Bayes: because it assumes independence of features it's expected to perform poorly to provide a point of reference.

C4.5: General and interpretable model without assumptions of feature independence.

Random Forest: One of the most widely deployed methods, uses boosting.

C4.5 with AdaBoost: ensemble enhancement to the exist—

All exemplary methods above can produce interpretable outputs, in contrast to a method such as neural nets, which can be one element of the motivating criteria. For each exemplary method, the intrinsic validation measures are considered below.

Exemplary Results

The exemplary experiments for the exemplary technique indicate the ability of Machine learning methods to accurately and compactly identify the similarity in traces even for highly polymorphic malware such as Zeus. While the accuracy attained can be 97:95%, and therefore comparable with other previous results, it should be emphasized how other desired properties of a learning method can be accomplished with a particular attention to model complexity. Several images of the classification features (e.g., with tagging) can presented, which can provide the intrinsic validation metrics for each classifier, and can indicate how each malware classifier can be used to create properties for the assignment Exemplary Sparse Feature Space and Reduction.

The computed feature space for the classification problem can be rather large, containing counts over the sets F_F_ (F_F), since the exemplary API-scraping technique tools can target a total of jFj=527 functions, this can amount to a feature space as large as jFj4=77; 133; 397; 441. All exemplary methods investigated can naturally discount any non-positive counts. Therefore a natural sparsity in the feature space can exist, and can be exploited by these exemplary methods. In addition to the sparse occurrence of features, all exemplary methods can be sensitive to selection of the most distinguishing features. Therefore the more distinguishing features can be selected with higher priority.

Exemplary Accuracy.

Figure 4A:
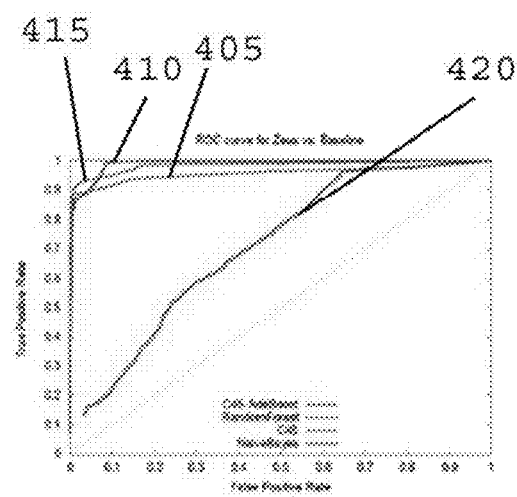
FIG. 4A is an exemplary graph illustrating the statistical power of receiver operating characteristics for binary classifiers according to an exemplary embodiment of the present disclosure.
Figure 4B:
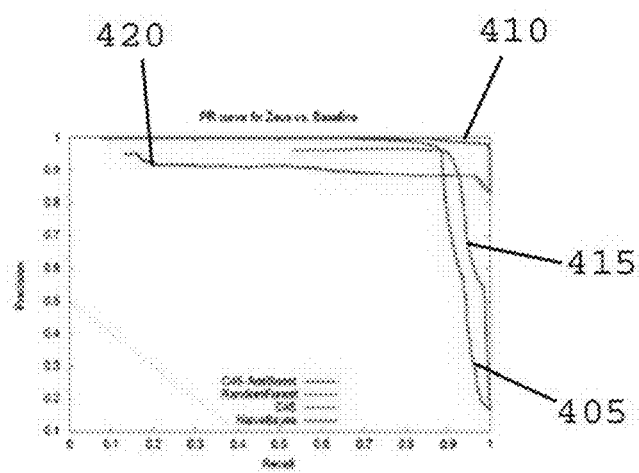
FIG. 4B is an exemplary graph illustrating the statistical power for precision and recall characteristics for binary classifiers according to an exemplary embodiment of the present disclosure.

This can be measured as average accuracy in 10-fold cross validation testing for C4.5 with Adaboost just above 97.95%, improving slightly the performance of C4.5 with no ensemble methods (e.g., at 97.4%) while the accuracy of Random Forest can be similar (e.g., at 97.5%). The exemplary technique average accuracy can measure across the 10-folds and may not demonstrate the trade-offs of false-positives versus true-positives which can be an important consideration in detection systems where there can often be a high cost to false positives (e.g., the abandonment of a detection system). To address this, the receiver operating characteristic ("ROC") are presented below as well as in FIG. 4A, which includes Naive Bayes as a comparison point for the methods of C4.5 (e.g., line 405), C4.5 with Adaboost (e.g., line 410), and Random Forest (e.g., line 415). The comparison to Naive Bayes (e.g., line 420) suggests how these classifiers perform in contrast to a relatively simple method, which makes invalid assumptions in the independence of features. As shown in FIG. 4A, the Naive Bayes performance can be the poorest performer, doing slightly better than random guessing. With the power measure of ROC, false positive versus true positives tradeoffs can fail to account for large imbalances in class size for which precision and recall offer alternative views as presented. Since the exemplary technique data corpus contained a baseline dataset approximately four times the size of the Zeus dataset, the exemplary technique class sizes can be highly varied. To address this concern, the additional statistical power measures of precision and recall are illustrated in FIG. 4B, which can be more robust to the effects of variable class size.

Exemplary Model Complexity.

For trace-based classifiers, the complexity can address the exemplary technique's specific interest in obtaining low complexity and compact descriptions for malware sets as properties. Low complexity descriptions of properties (e.g., themselves fairly large objects) can address the need that a property be mutable and interpretable so that it can be adapted to evolution in attack method. Implementing trace detection can be done with a wide variety of exemplary techniques, but because with models which can be interpreted and modified by agents of a social-technological network, it can be possible to create adapted defense options, the lower the complexity, the more admissible the model can be to directly reasoning by an agent or an agent team aligned to address an attack threat in the wild. To explore this aspect of the resulting classifier in an exemplary embodiment, a measure of complexity can be created as a number of decisions in the resulting decision tree, and can be experiment with how the accuracy can depend on iterative refinement, which can decrease the model complexity.

Figure 5:
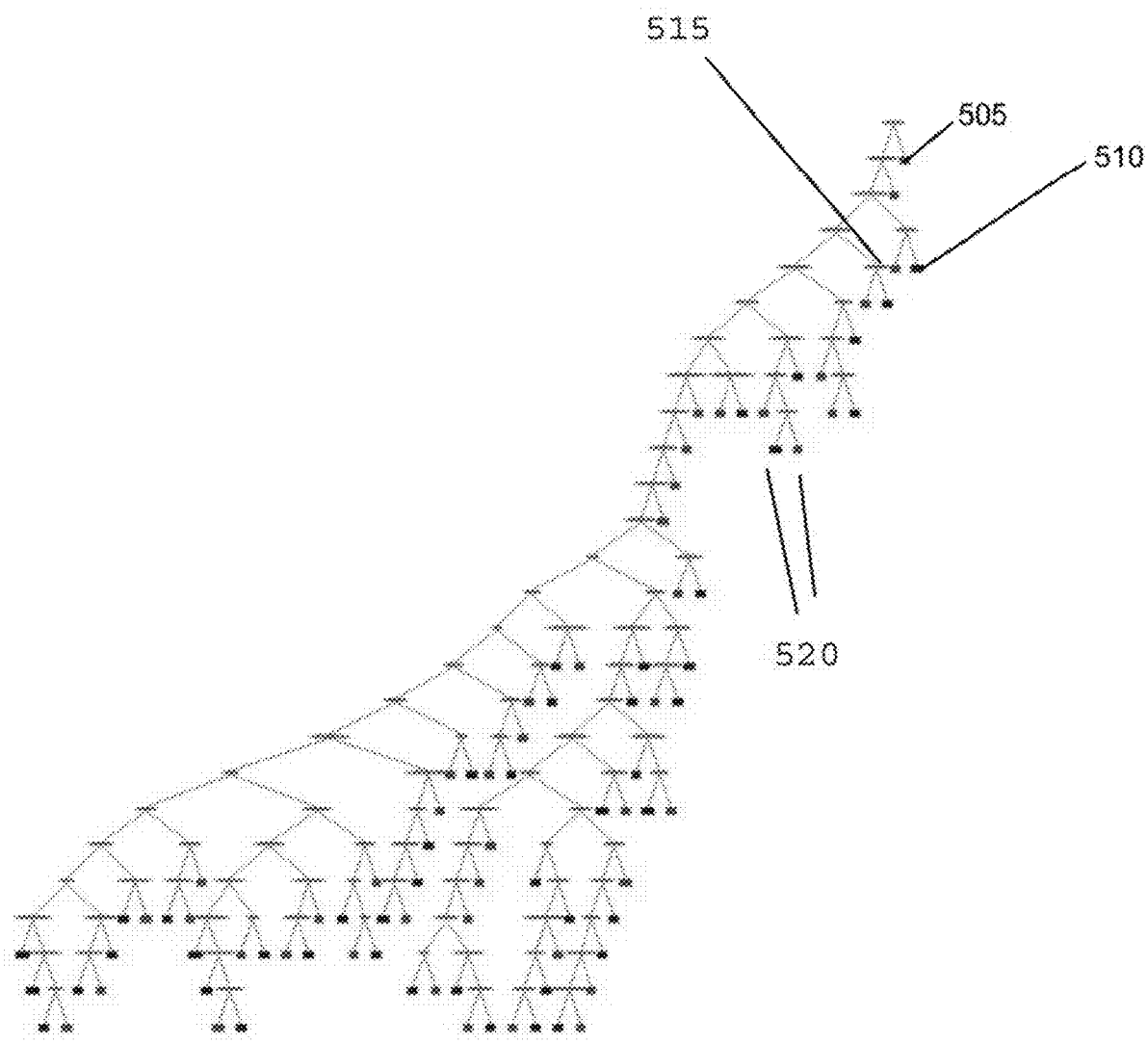
FIG. 5 is an exemplary graph illustrating an exemplary trace classifier according to an exemplary embodiment of the present disclosure.

Complexity measures can also be of theoretical interest, and can motivate the definition of hyper properties as a means to more compactly describe security properties. In addition from a practical viewpoint, model complexity can also be a typical concern associated with model generality, and to avoid the possibility of model over-fitting. Another outcome can be that a low complexity model can provide a simple structure to summarize a large object (e.g., large set of trace objects, themselves long sequences of behavior action). Consider again the trace sequences viewable in FIGS. 3A-3D, for which visual capacities can perceive structure, at least more so than the clone study in FIG. 2, which reveals highly polymorphic images, the complexity measure can summarize how efficiently the model can be capable of capturing this similarity in structures in the trace sequences. FIG. 5 illustrates an outcome of exemplary experiments. The model complexity can relate directly to size (e.g., number of edges 515, number of nodes 520) of the decision tree. Nodes 505 are features prescribed by property and nodes 510 are featured described by the background set.

Exemplary Low Complexity and Robustness.

Through iterative parameter refinement, the exemplary model in the first exemplary iteration (e.g., shown in FIG. 5), can be reduced in complexity by decreasing the targeted confidence parameter in C4.5. By decreasing the confidence parameter, more concise models can be induced, and the effect on accuracy can be explored in Table I below. This exemplary procedure can explore this notion of robustness, and can suggest that very simple models (e.g., induced by decreasing the confidence parameter) can retain many of the features needed to accurately distinguish Zeus's behavior from the baseline. Specifically, Table I shows that while more concise models can be induced by pruning the resulting decision tree of C4.5 (e.g., no boosting) to create a sequence of models with decreasing complexity (e.g., quantified as number of leaves/branches), much of the accuracy measured with 10 fold cross validation can be maintained.

TABLE I

ROBUSTNESS OF INDUCED MODELS WITH LOWER COMPLEXITY

| iteration | leaves | branches | accuracy |
|---|---|---|---|
| 1 | 91 | 181 | 97.44% |
| 2 | 74 | 147 | 97.16% |
| 3 | 55 | 109 | 97.03% |
| 4 | 43 | 85 | 96.48% |

Exemplary Features Selected.

The contribution of each feature class to the overall result is presented in FIG. 5. A direct count of how many features can be from f+, f−, and π in the tree at iteration 1 (e.g., pre-pruned tree) shows the counts to be about 145, about 166, and about 658 respectively, showing that about 67.905% of the features selected by the model can be from the transition class π, indicating that the exemplary learning method can find distinct strengths to leveraging information associated with the transitional k-grams even for k=2.

Exemplary Computing a Property from a Classifier.

Below illustrates how the results of property learning can themselves be used to compute a system security property that could be checked on an end point device using a trace monitor. This procedure can complete the overall objective of creating a defense option which meets the needs of a recommendation-verification system.

Below are exemplary equations which can be proscribed from an observing trace monitor on an end point device as Czeus in FIG. 6A. The distinction of how Zeus distinguishes itself in behavior from other malware families as Cbaseline is shown in FIG. 6B. With variables vi for i∈{1, 2, . . . 180} defined as a system of 180 variable (partially) viewable in FIGS. 6C and 6D.

Exemplary Discussion

The exemplary experiments show how machine learning can be directly linked to the formal and theoretical framework of properties, which can be transferred among agents in a social-technological network. The exemplary machine learning results of accuracy can be consistent with other studies, but the model complexity can be further explored as a first order consideration, and the addition of primitive subsequence k-mers can be speculated as potential features that can contribute greatly to the results with low complexity and robust even when inducing simple models. Each of these findings can be important for the overall goal of designing a recommendation-verification system. Consider the single example of a Zeus detector created with machine learning of trace sequences, published to a recommendation-verification system as a property for end point deployment along with intrinsic measures of accuracy, statistical power, and complexity, this property can be explored as a defense option to any agent in a social-technological network. Any agent can therefore adapt this exemplary strategic option with an M-coin incentive; the option can then be evaluated for its extrinsic effectiveness by a consensus, or perhaps by comparison to other competing properties. Receiver agents can provide reputation benefits to the agents, creating the effective security properties (e.g., defense options) with its distribution evolving in proportion to the extrinsic effectiveness. Because the option can be interpretable and exchanged as a property, it can be mutated or recombined by cross-over with other successful strategies to create novel options which can prove more effective than the source options. From the defense perspective, options can be subsampled to create ensembles and variations providing: (i) mixed strategies, (ii) innovation of strategies, (iii) trembling hand strategies and (iv) population heterogeneity, etc.

The exemplary system, method and computer-accessible medium, according to an exemplary embodiment of the present disclosure, can be modeled in terms of classical Information-Asymmetry Games (e.g., also called Signaling Games), where the players (e.g., agents) assume either a role of a sender (S) or that of a receiver (T). The sender has a certain type, t, for instance: (i) beneficent (e.g., C for cooperator) or (ii) malicious (D for defector), which could be assumed to be given by nature. The sender can observe his own type while the receiver does not know the type of the sender. Based on his knowledge of his own type, the sender can choose to send a message from a set of possible messages M={$m_1$, $m_2$, $m_3$, . . . , $m_1$}; these messages can be allowed to be complex: for instance, an offer of a mobile app with certain advertised utility and a price. The receiver can observe the message but not the type of the sender or the ability to fully verify the message. Then, the receiver can choose an action from a set of feasible actions A={$a_1$, $a_2$, $a_3$ ..., $a_k$}; the receiver can be oblivious/trusting (e.g., C for cooperator) or vigilant/mistrustful (e.g., D for defector). The offer of a mobile app can be ignored, accepted, verified or rejected (e.g., with a possibility of a reputation-labeling of the app, the sender or the app-store, etc.). The two players can receive payoffs dependent on the sender's type, the message chosen by the sender and the action chosen by the receiver.

Because of the informational asymmetry, it can be possible for a sender to be deceptive, as can often be the case in the cyber context. Traditional techniques such as making the signaling somewhat "costly" for the sender can help, but must be engineered carefully, since otherwise the very information-sharing capabilities of the cyber system can be seriously compromised. In contrast, the exemplary system, method and computer-accessible medium can be based on an explicit pricing system, using M-coins. Additionally, credible deterrence can be used.

Exemplary Game Theoretic Models

Table 2 below describes a parameterized payoff matrix associated with a single transaction, where a sender can act in the "cooperate" behavior mode by sending a useful app honestly or the "defect" behavior mode by sending a malicious app deceptively, and where a receiver can act in the "cooperate" behavior mode by accepting trusted or the "defect" behavior mode by responding with a challenge. The payoff-parameters in the table can be as follows: a=the cost

TABLE 2

| Row player is the sender, column player is the receiver Sender, Receiver receive trusted receive challenge |
| --- |
| send clean (a, −a + b) (a, −c, −a − g) |
| send malware (a + d, −a − d) (a − c − e, −a + f − g) | of app, b=the value of app, c=the cost of verification, d=the benefit of hack, e=the cost of getting caught, f=the benefit of catching malicious user, and g=the cost of challenging a sender.

Table 3 below simplifies the payoff matrix for the joint strategy considering both roles of sending and receiving per user in repetition of a single transaction.

TABLE 3

| | Row player is the sender, column player is the receiver. | | | |
| --- | --- | --- | --- | --- |
| row col | CC | CD | DC | DD |
| CC | b | b − c | −d | −c − d |
|  | b | −g | c + d | a − g |
| CD | −g | −c − g | f − g | −c + f − g |
|  | b − c | −c − g | b − c − e | −c − e − g |
| DC | b + d | b − c − e | 0 | −c − d − e |
|  | −d | f − g | U | d + f − g |
| DD | d − g | −c − e − g | d + f − g | −c − e + f − g |
|  | −c − d | −c + f − g | −c − d − e | −c − e + f − g |

Exemplary Results from Simulation

To examine the details of the potential dynamics of the resulting repeated game, a reproducing population model can be considered where reproduction of a given strategy can depend on its performance. Strategy mutation can be possible in order to explore all possible finite strategies with mutation rates determined by a parameter μ.

The population structure parameters δ and α can be included, similar to how they were used previously to explore reciprocity, and to provide observations over a unit-square in δ×α. Note that when δ=α=0, the sender-receiver-pairs for each game are randomly chosen regardless of their types, and can change in every round; whereas when δ×α=1 the sender-receiver-pairs remain constrained to similar types and can be unchanged from round to round. In general ((δ,α)∈[0,1]$^2$\{(0,0), (1,1)}) the pairing can be done with similar or dissimilar types for a round and can remain fixed for a random number of rounds of the game.

The exemplary simulation model can be as follows:

Exemplary Initialization:

Create a random population of N users who choose a repeated-game strategy randomly over a set of seed-strategies. This set of agents can provide the population at time k=0. The simulation model can be constructed with the following update-cycle.

Exemplary Pairing:

Using the population at time (k−1), N/2 random pairings can be created.

Exemplary Population Structure Parameter:

For each pair with probability, a one strategy can be selected with the other removed and replaced with a copy of the selected strategy. Therefore, for a given strategy s within the population, its probability of playing itself can be α+(1−α)$p_s$ where $p_s$ can be the frequency of strategy s's occurrences in the population at time (k−1). Parameter α facilitates an investigation into a spectrum of possible population structures from α=0 (e.g., random pairing), to α=1 (e.g., stronger and general forms of kinship and spatial/network-connectivity-based closeness for α>0).

Exemplary Strategies:

Each selected pair can play a repeated game with the number of plays dependent on a geometric distribution with continuation parameter δ. The expected number of plays per game can be 1/(1−δ), for example δ=0 can reduce to single shot games.

Exemplary Payoff:

Strategy payoff can be determined using automata and a payoff matrix. A multiplicative discount factor for payoff can be introduced.

Exemplary Iteration of Round:

A population of size N can be re-created by sampling the strategies at time (k−1) using a distribution whose density can be computed as proportional to population normalized performances. This set of agents can provide the population at time k.

Exemplary Mutations:

Each user-agent can be subject to the possibility of mutation with mutation rate μ. A mutation can create a strategy one-mutation step from its previously selected strategy determined in the preceding step. Mutation steps can add or delete a state, re-label a state or re-assign an edge destination. Mutation rates are performed in-situ on the population updating the population at time k. Behavior modes can depend on parameters d, e, f, g.

Exemplary Strategies

FIGS. 7A-7D illustrate strategy-profiles with a single state (e.g., state 730). FIGS. 7E-7L illustrate several more strategy-profiles with two states (e.g., states 735 and 740). Repeated game strategy can be encoded as finite state automata. Arrows 705 indicate initial state. Arrows 710 indicate a play of sending cooperatively and receiving trusted. Arrows 715 indicate a play of sending cooperatively and receiving untrusted (e.g., defect action may challenge reputation of sender). Arrows 720 indicate a play of sending defect (e.g., attacks) and receiving trusted. Arrows 725 indicates a play of sending defect and receiving untrusted.

Arrows can also indicate the transition taken depending on an opponent's previous play. A repeated game may occur for any pairs of agents; the number of plays can be determined by a geometric distribution continuation parameter δ. Twelve seed strategies can be used for population dynamics with evolution pressures for strategy fitness.

FIGS. 8A-8P show the asymptotic structures of the strategic behavior of the population. Infrequent mutation rates can be applied to populations of twelve seed strategies to provide a notion of what strategies have advantages and can be culled for various environments or settings of payoff matrix values. Each figure provides a view of which strategy fixates in the population at various values of d, e, f, g. Pie charts are organized over the unit square of α, δ as they are, for example, in physics, chemistry or biology.

Cyber-security can essentially be an applied science that can be informed by the mathematical constructs of computer science such as the theory of automata, complexity and mathematical logic. In contrast, it can be shown that by suitably modeling, the agents of a system, and the utilities they wish to achieve in cyber space, and under the standard assumptions of common knowledge of rationality, a suitable law can be imposed, which can evolve to a desirable equilibrium.

Limiting measures of send cooperate and receive cooperatively. FIGS. 9A-9P illustrates the nature of cooperative behavior as a function of the parameters δ and α that can jointly determine correlation of encounters. For example, FIGS. 9A-9P illustrate the aggregate population behavior at various values of d, e, f, g showing overall percentage of time a population sends cooperatively and receives trusted. Each figure has four sub charts with average percentage send cooperatively plays shown in the upper left panel 905, average percentage of receive cooperatively plays shown in the upper right panel 910, and standard deviation for each percentage shown below in panels 915 and 920. Each quadrant provides a view for simulations over the α, δ parameter unit square.

Exemplary Minority Games with Epistatic Signaling
Exemplary Epistatic Signaling

At the core of epistatic signaling games can be the outcomes of receiver challenges against sender attacks, which can result in detection events. In epistatic signaling games, it can be assumed that there can be K distinct attacks, $A=\{a_1, a_2, \ldots a_K\}$, and that the sending agent can employ any subset of these when encountering a consumer receiver agent. Therefore, the sender can send $2^K-1$ different combinations of attacks as well as the clean or benign signal, which can be modeled as the empty subset $\emptyset \subset A$. Therefore, the subsets of A can represent sender options for an agent. Likewise, the receiver can identify, prove or certify each/any attack the sender has access to. Letting $c_i$ be the check against attack $\alpha_i$, the sender's options can be subsets of $C=\{c_1, c_2, \ldots c_K\}$ with the empty set $\emptyset \subset C$ also indicating the option of receiving messages with no challenge which can be interpreted as either a trusting or insouciant option. When the receiver challenges the sender four possibilities could result.

Exemplary True-Positive:

The effort to seek certification (e.g., invested by the receiver at the challenge cost of G per challenge) can result in a detection event which can determine that the sender can be a deceptive attacker. Within a social network, the detection event can carry a heavy reputational cost for the sender, which can be referred to as E, the cost of getting caught. For the receiver, a reputational benefit for catching the attacker F can also be conferred, and can help to balance the challenge cost of G. Further, the benefit of F can be higher when the challenging receiver can be in a minority, as he shares the benefit with few others.

Exemplary False-Positive:

The receiver who claims that a particular sender can be a deceptive attacker (e.g., when in fact they may not be) will not impart the high cost of getting caught upon the sender because the proof will not be repeatable by other challenging receivers. Therefore the net result of a false positive can be a cost incurred by the receiver in proportion to the number of challenges (e.g., at G per challenge) against the sender. Additionally, it can be argued that the sender should incur a direct reputational cost as well. While this may not be modeled explicitly, the symmetric and repeated game can provide some ability to model these costs by reversing the roles of sender and receiver, and in this context, the false accusation can be treated as attack (e.g., in the next round).

Exemplary False-Negative:

Despite the effort to seek certification (e.g., invested by the receiver at cost G) the receiver may not recognize the deceptive actions of the sender, and thus, the sender can achieve an attack at benefit D, and for each attack (e.g., all at the cost of the receiver).

Exemplary True-Negative:

Despite any and all effort to seek certification (e.g., invested by the receiver at cost G per challenge) the receiver does not detect any deceptiveness in the actions of the sender while the sender launches no attacks against the receiver.

Exemplary Strategy for Repeated Epistatic Signaling Games.

In each encounter, the agents can play the role of either sender or receiver. There can be $2^K$ strategic options available to the sender (e.g., all the subsets of A), and $2^K$ strategic options available to the receiver for checking each attack set (e.g., all the subsets of C). In a single round of play, the challenges of the receiver can be matched against the attacks of the sender to determine how many detections can be achieved, letting m, $0 \leq m \leq K$ can be the number of detections the penalty for which the sender will include a cost for getting caught will be m·E, (e.g., E being the cost of getting caught). Thus, the cost for sending more attacks/vulnerabilities scales with the number of detections the receiver achieves, while the benefits scale with the number of attacks attained.

The symmetric epistatic signaling game can facilitate the agents of each encounter to play both the roles of sender and receiver. Therefore, the strategic options for each agent can include a sending option and an independent receiving option. The symmetric form of the epistatic signal game can provide some ability to treat the false-accusation as itself an attack, which can also be debunked as a challenge, but generally can treat agents of a population as having equal access to strategic options. Because interactions among agents in cyber space can be inherently dependent on prior interactions, strategies for single shot games may not sufficiently model the environment. However, a strategy for repeated games can address how an agent receiver should react when the sender in an encounter has been detected as a deceptive attacker. Therefore, the detection event, which can be the matching of at least one of the receiver challenges to the associated sender attack, can be an important event because, in the absence of detection, an attack may not be immediately distinguishable from a benign signal.

To incorporate the detection event into the strategy of an agent, which can play symmetric repeated games, each agent can be modeled as a labeled deterministic finite state automata ("DFA"). Labeled DFA can provide a means to evolve complex strategic interactions spanning multiple plays of a repeated game among agents. This exemplary technique can enhance the dynamics possible while simple mutation can provide a method or a configuration for exploration (e.g., of a vast strategic space), thus facilitating an ensemble of agents to adapt strategies to population dependent fitness landscapes.

Exemplary Signaling Games in Cyber Security

In signaling games for cyber security, the notion of deception was a primary consideration in the simulations revealing a range of outcomes for system behavior over the space of payoff parameters. Epistatic signaling games can differ from signaling games for cyber security in the following two exemplary ways. First, in signaling games, the strategic options for sender and receiver can be limited to a single attack and challenge option. Such a game can be a special case of the general epistatic signaling formulation when K=1. By considering the dynamics of diverse attack Exemplary Strategic Options:

In signaling games, e.g., the sender can select the option to send cooperatively C or to send an attack D. Similarly, the options for the receiver can be to accept trusting C or to challenge D. All options can be encoded using strings where the first letter can be the sender option and the second the receiver option. Using this encoding, the option space for a single round of signaling games can be the set {CC, CD, DC, DD}.

Exemplary Game Payoff:

The payoff matrix for the exemplary symmetric signaling game can then be defined over the product of row-player options and column player options {CC, CD, DC, DD}× {CC, CD, DC, DD}. d can be the benefit of an attack for the sender (e.g., assumed to be a zero sum quantity), e can be the cost of getting caught attacking as sender, f can be the prize for catching an attacker, and g the cost of challenging a sender as receiver. The contributions to payoff of these quantities for the row player payoff can be, for example:

| (row, col) | CC | CD | DC | DD |
| --- | --- | --- | --- | --- |
| CC | (0, 0) | (0, −g) | (−d, d) | (−d, d − g) |
| CD | (−g, 0) | (−g, −g) | (f − g, −e) | (f − g, −e − g) |
| DC | (d, −d) | (−e, f − g) | (0, 0) | (−d − e, d + f − g) |
| DD | (d − g, −d) | (−e − g, f − g) | (d + f − g, −d − e) | (−e + f − g, −e + f − g) | and defense portfolios in a population as set systems over $2^A$ and $2^C$, more realism can be provided, such as undetected attacks (e.g., the false-negatives detection events), but the possibility that strategic options for attack and defense can be scored to bias the selection process during mutation events (e.g., versus uniform random selection), and this can be an important consideration in a social-technological recommendation-verification system which a population could employ. When the agents can be facilitated to select the options in challenging, based on performance rather than obliviously or randomly, it can have a distinct effect on the overall system behaviors ahead.

The second exemplary way in which this exemplary approach can differ from traditional signaling games can be that the transitions can be simplified in strategies for repeated games. In this exemplary approach, the agents can be limited to two transitions based on if a detection event has occurred or not. While this constraint can appear to be limiting, it can be more realistic since agents can be primarily interested in resolving an attack (e.g., detection event). Note particularly that in the case of False-Negatives detection events, the user may not have immediate access to what attack succeeded, and identifying all such non-detection outcomes can seem reasonable. There remains the possibility that a receiver who achieves a detection can select subsequent play options based on the attack resolved (e.g., a more sophisticated attack can call on a stronger reaction than a weaker one). However, the game's structure can be kept simple, and the constraint can be imposed such that transitions in strategies can be binary and determined by whether a sender can achieve a detection. This constraint could also be achieved in the exemplary simulations by utilizing the fact that mutation of strategies maintain certain equivalencies in transition structure. To illustrate the exemplary relation between signal games and this exemplary approach of epistatic signal games, the strategic options and payoff of signaling games for cyber security are described below.

Note that the column-player payoff can be the transpose of the row-player payoff (e.g., symmetric games).

Exemplary Epistatic Signaling Games.

The exemplary Epistatic Signal game can be defined below as an extension of signaling games. Strategic options and game payoffs are discussed below. To assist in computing payoffs, a few auxiliary accounting functions can be introduced. The auxiliary functions can be introduced by considering two phases of each symmetric game: (i) the play can be in offense when the agent can be a sender facing a potentially challenging receiver, and in defense when the agent can be a receiver facing a possibly deceptive sender, and (ii) the payoff function for a row-player can be presented, and the transpose relation for the column-player payoff can be exploited.

Exemplary Strategic Options:

In this exemplary approach, the size of the signal space available can be increased to the agent in each round. Therefore, the sender and receiver can have vastly more options for strategic selection. By letting $A=\{a_1, a_2, \ldots a_K\}$ be the finite set of attack vectors to include zero-day attacks, vulnerabilities, injections, deceptions, social engineering, etc. and letting $C=\{c_1, c, \ldots c_K\}$ be their associated counters or detectors, the options for sender to include every element of $2^A$ and the options for receiver to include $2^C$ can be increased. An agent who can provide apps can send no attacks, but can include vulnerabilities (e.g., perhaps, unwittingly) Thus, these actions can be modeled as subsets of A.

Therefore, in a single round of the exemplary symmetric game, the agent has options $\{(A', C'): A' \epsilon 2^A, C' \epsilon 2^C\}$. The first index can refer to a subset of A employed by the agent as sender and the second index can refer to a subset of C employed by the agent as receiver. $U=2^A \times 2^C$ can include the strategic options for an agent in symmetric epistatic signaling games.

Exemplary Game Payoff:

The form of the payoff matrix for the epistatic signaling game can be considered as an assignment of payoff (e.g., for the row-player i against column-player j) over the product space of signals: U×U. The $u_i \epsilon U$ can be the strategic option for the row-player and $u_j \in U$ can be the strategic option for the column-player, $u_i = \alpha_i \times \gamma_i$ and $u_j = \alpha_j \times \gamma_j$ with $\alpha_i$, $\alpha_j$, $\gamma_i$, $\gamma_j \in \{1, 2, \ldots, K\}$ to index, in turn, the corresponding attacks employed by row-player, attacks employed by column-player, defenses fielded by row-player, and defenses fielded by column-player.

The payoff matrix for epistatic signaling games can take the form $M(u_i, u_j)$ to quantify the payoff for the row-player when the row-player i employs option $u_i$ and column player j employs option $u_j$. Further the payoff for the column player can also be the transpose of indices that can be $M^T(u_i, u_j) = M(u_j, u_i)$.

Exemplary Payoff Values:

To compute $M(u_i, u_j)$ a few simple auxiliary accounting functions involved in stages of the symmetric game for a single player (e.g., the row-player) can be introduced. The stages can be the offense stage when row-player can be a sender, and the defense stage when the row-player can be a receiver.

Exemplary Offense:

In each round of play, the row-player i can launch a total number of attacks against the column player j counted as ATTACKS-FIELDED $(i, j) = |\alpha_i|$, while the number of successful attacks by the row player i against the column player j can be counted as ATTACKS-ACHIEVED $(i, j) = |\alpha_i \setminus \gamma_j|$. For each attack launched by the sender, a fixed cost H can be added to the overall cost of the sender option. This fixed cost can be associated with the cost to develop/deploy an attack, identify software vulnerability, develop an exploit or apply resources to attack. For each attack achieved by the row-player i against the column player j, a fixed zero-sum equity of D can be transferred to the row-player as a benefit at the expense of the column-player. This zero sum equity can be intended to model the value of a digital asset, authorization token, credential, personal identifiable information, or digital currency (e.g., bitcoin or more specifically, M-coin), etc.

Exemplary Defense:

In each round of play, the row-player I can field a total number of defenses (e.g., or checks) against the column-player j, denoted as DEFENSES-FIELDED$(i, j) = |\gamma_i|$, while the number of effective defenses or equivalently detection events for the row player i against column player j can be counted as DETECTS$(i, j) = |\gamma_i \cap \alpha_j|$, and finally the false positive challenges for player i against player j can be counted as: FUTILE-CHALLENGE$(i, j) = \gamma_i \setminus \alpha_j|$. For each defense fielded by the receiver, a fixed cost G can be applied to the strategic option. This cost can be treated as a cost to develop the detector procedures, and can be amortized and scaled to affordable quantities via a social-technical network where detection methods can be deployed. Each detection event can impose a heavy cost of E on the sender, and can also confer a benefit of F to the receiver. The cost associated with a detection event for the sender can be designed to model the loss of reputation, loss of security certifications, M-coin tokens, etc. As an example, a code project that imparts users with a large vulnerability surface can naturally suffer a reputational loss as multiple receivers can prove its deficiencies. Defenses that can be fielded, but do not result in detections, can be considered futile (e.g., at least for that round), and can carry a cost burden for the receiver, thus imposing a natural pressure on agents to be parsimonious with detection, and thereby establish an incentive to measure effectiveness of receiver options so that the most effective methods for detection can be selected and propagated in a population.

Facilitating strategy mutation for dynamic drift in attack and detection efficacy as well as introducing a realistic aspect in that strategy effectiveness can be dependent on the context of the population of strategies employed.

Payoff Structure for Epistatic Signal Games:

For row-player i selecting option $u_i = \alpha_i \times \gamma_i$ playing against column player j who can select option $u_j = \alpha_j \times \gamma_j$ the row-player payoff can be defined as, for example:

$$M(u_i, u_j) = D \cdot \text{ATTACKS-ACHIEVED}(I, J) - D \cdot \text{ATTACKS-ACHIEVED}(j, i) + F \cdot \text{DETECTS}(i, j) - E \cdot \text{DETECTS}(j, i) - H \cdot \text{ATTACKS-FIELDED}(i, j) - G \cdot \text{DEFENSES-FIELDED}(j, i)$$

The settings of parameters D, E, F, G, H can be shown to be beneficial for the behavior of a system for evolving populations. The important distinction for this exemplary model (e.g., epistatic) can be that costs/benefits that can be facilitated to scale (e.g., linearly) in the counts of the following: (i) number of attacks, (ii) number of defenses and (iii) number of detections. These scale laws naturally place incentives on selecting effective options, and afford a means to study many system behavioral outcomes of interest such as system effects for various rates of evolution in attacks versus defenses.

Exemplary Minority Signaling Games

In Signaling Games played in social technological systems, consider the possibility of variable costs/payoffs depending on bulk population behavior. In this context, there will be certain advantages (e.g., in reputational gain) by being in the minority as a challenging receiver. These considerations led to the formulation of minority signaling games. If early adapters (e.g., minorities) have slight preferential advantage there can also be incentives for the population to develop and maintain diverse challenging options. It can also be possible that a population that develops and sustains diversity in strategies can mitigate some of the wildest dynamics observed in signaling games, which include drifting oscillation between low to high levels of attacks and checking (e.g., either all players deciding to challenge or to be insouciant).

To study this problem, non-constant cost/payoff coefficients in the payoff structure can be introduced, as well as a mechanism that can give rise to dynamics similar to the El Farol bar problem. To introduce El Farol bar dynamics into the epistatic signal games, facilitating the cost parameter G to vary based on bulk population behavior, the simplest adjustment can be a step function which can increase the cost (e.g., by a multiple $\zeta$) when the fraction of outcomes in a population can exceed a given fractional threshold $\tau$. The set of agents can be defined as $U = \{u_1, u_2, \ldots, u_M\}$ and all the games occurring during encounters in a given generation can be considered. Summing over all encounters during a generation, C can be a monitor for the fractional amount of checks deployed among all defensive receiver options compared to the total possible capacity for checking during the generation (e.g., if all receiver options employed every check).

In minority signaling games, the general form of the payoff for a row-player can be a, slight modification to equation for $M(u_i, u_j)$ where the coefficient G can be modified to be a step function depending on the population quantity A computed during the games of a generation. Thus, for example:

$$G(U) = \begin{cases} G & \text{if } C(U) \leq \tau \\ \zeta \times G & \text{otherwise} \end{cases}$$

Exemplary Simulations

The exemplary simulation results are discussed below by first outlining the general framework for evolutionary games which will be used throughout as the underlying simulation model for the population of social technical users. Next, a set of two experiments for epistatic signaling games are outlined, which were designed to provide insights into the nature of system evolution and dynamics. After providing some simulation visualizations of the basic epistatic signaling game, the following exemplary experiments were investigated.

Exemplary Effect of Strong and Transparent Measures for the Challenge Options in a Population Versus Random Selection.

This exemplary experiment seeks to compare the system behavior in each of the following two cases:
  (i) Receiver challenge options can be selected uniformly randomly over the receiver option space (e.g., when mutation events occur).
  (ii) Receiver challenge options can be selected based on performance measures proven in the previous generation of games (e.g., when mutation events occur). Some fraction of mutations that can affect receiver options can be selected uniformly randomly over the entire receiver option space.

Exemplary Effects of Minority Games and El Farol Dynamics when Applied as a Step Function for Sender Costs.

This exemplary experiment can introduce the population behavior based step function G(U) already defined with fractional behavior quantity C and threshold τ and explores if this mechanism can diversify sender options in a population and can lead to effects on system dynamics.

Each of these results can be meaningful for prospective engineering of better cyber security in social-technical networks. In the first exemplary experiment where the effects of strong and transparent measures for challenge options, a possible means to organize a distributed cyber response system related to epistatic signaling games and related to other notions of cellular immune response systems can be investigated.

In this exemplary experiment, the fraction can be positive to prevent fixation effects that can otherwise occur on the receiver strategies, while the sender strategies can be facilitated to mutate freely. To retain the ability for receiver options to adapt defense strategies to novel attack strategies, a positive can be utilized. While the effects of mutation rates and can be of practical interest, the exemplary experiment can provide only a start in that direction.

The second exemplary experiment can address some of the wild dynamics observed in these exemplary systems, which can include constructs such as defection invasions, and spontaneous cooperation as well as wild oscillation between them. The exemplary experiment can be designed to investigate the possible effects of a mechanism, which can incentivize the parsimonious use of defense options, the diversification of defense options, and increase stability in these complex dynamics. Such a mechanism can either be designed as part of a system, or otherwise can be discovered as a natural factor.

After outlining the general framework for evolution games, the slight augmentation of the framework needed to conduct the experiments is described. The results obtained from the experimentation can be reported in images and exposition of what this can mean for security in social-technical systems.

Exemplary Simulation Outline

The general simulation can be outlined, and the descriptions of how this can be augmented or how each procedure can be modified to achieve the analytic procedures.

Exemplary Shape Parameters: <M, K, N>: population size, option set size, and number of generations. System Parameters: <D, E, F, G, H, δ, μ,>: payoff settings, continuation factor, and mutation rate. Initialize: A population U of M users initialized with random strategies.

For each generation:
  Exemplary Encounter: Using the population of strategies (e.g., time n), pairwise encounters for game play can be created.
  Exemplary Play: For each encounter, repeated games can be played using agent strategies. The number of rounds determined by continuation parameter δ. Each player can aggregate a vector of outcomes.
  Exemplary Aggregate and Evaluate Scores: Total performance measures can be aggregated across strategies and unique options used during the encounters for generation n. Scores and measures can be computed using epistatic signaling game payoff matrix, outcome vectors resulting from play, and system parameters.
  Exemplary Re-create: A population of A1 strategies can be recreated (e.g., for next generation n+1) by sampling the existing strategies with probability density proportional to performance scores.
  Exemplary Mutate: Players can be chosen with rate p for mutation. Each mutation event can modify the strategic encoding of basic strategies.

The encounters can be created in a variety of ways including: (i) random pairing, (ii) use of an underlying neighborhood graph to describe kinship or geographical relations, or (iii) various hybrid notions.

The use of population structure parameters δ and α, as discussed above, facilitated the study of mixture of random encounters to structured encounters resolvable up to a single parameter δ. In the exemplary experiments, $$\frac{M}{2}$$

encounters selected as random encounters can be used. During the play, the continuation parameter δ can be used to determine the number of rounds by generating a random geometric derivate with δ as continuation parameter. For pairwise agent encounters playing repeated games, each can use their strategy (e.g., described by a labeled DFA), which can be used to compute options and outcomes for each round of play during the repeated epistatic signal games. The labeled deterministic finite automata can be used in the following exemplary manner (e.g., described for the row-player). Starting from the start-state, the sending and receiving signals can be determined. If the row-player detects an attack from the column-player, then the red transition edge can be used to determine the next strategic options for both sending and receiving. If an attack was not detected, then the blue transition edge can be used to determine the next strategic option for the row-player. In either case, in the next round, the option including both send and receive can be determined. By following this sequence of steps in the strategic automata, each agent can aggregate a vector of outcomes (e.g., number of attacks, number of defenses, number of detections and number of time opponent detect their attacks). These aggregate counts can be stored for the next step where the strategies can be scored.

Mutation of strategy can be performed on the generation of M strategies with base rate μ, and with an expected number of mutants as μM per generation. Given that a strategy can be selected for mutation, one of the five mutation types can be selected according to a mutational type frequency vector which throughout the experiments can be fixed, for example at v=[0.15, 0.15, 0.1, 0.3, 0.3]. Next the exemplary mutational types can be described as, for example:

type-i: mutate the sender option.
type-ii: mutate the receiver option. The selection distribution can be the subject of experiment titled: Effect of strong and transparent measures.
type-iii: mutate an edge (e.g., selected uniformly randomly in all experiments).
type-iv: create a new strategy state with randomly selected edges. (e.g., throughout these experiments the size of automata can be limited to, for example, 256).
type-v: remove a strategy state. (e.g., throughout these experiments the size of automata can be limited to be one or more states).

In exemplary experiment one, the effects of strong and transparent measures can be investigated on receiver options, and the number of times each receiver option can detect an attack can be tracked. When a mutation event modifies sender option strategies, the send option can be replaced with a random selection with probability 1-ξ, and with probability ξ, and a performance scaled density can be used over the options at play in generation n. The first outcome (e.g., with probability 1-ξ) can mitigate the fixation of receiver strategies while the second outcome can facilitate the population to track existing attack vectors in the population more effectively.

In exemplary experiment two, where El Farol dynamics can be investigated, the aggregate and evaluate step can be augmented to compute C, and can update the evaluation of price per defense using function $G(U_n)$ for generation n. This can facilitate some conclusions about the use of such a mechanism in epistatic signaling game system to be drawn.

Figures 10A, 10B, 10C, 10D:
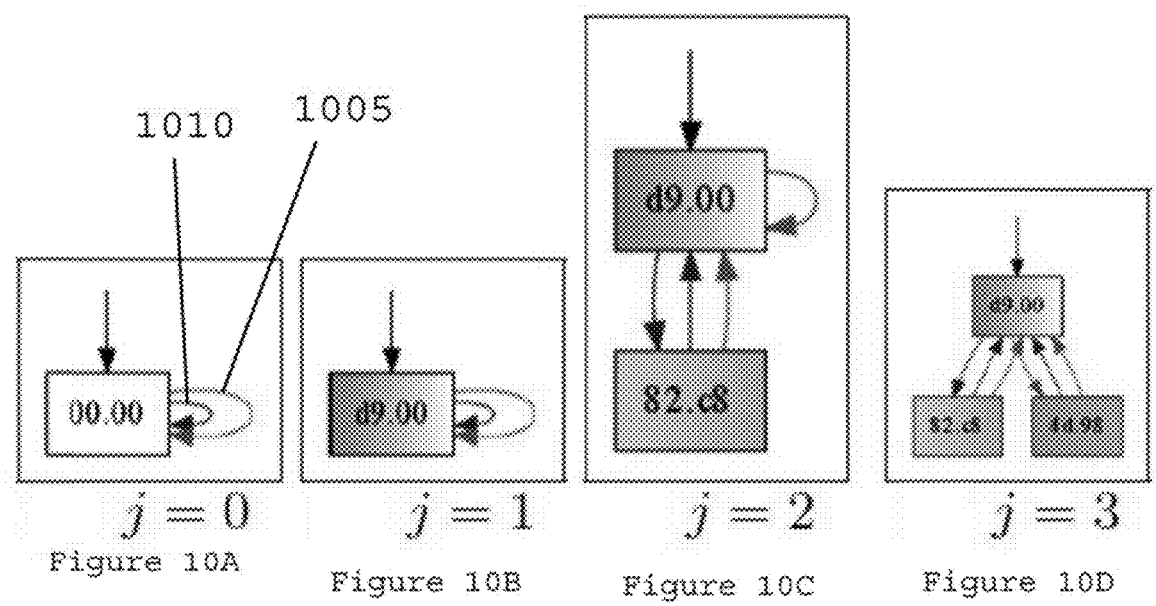
FIGS. 10A-10D are exemplary diagrams illustrating an exemplary signaling game according to an exemplary embodiment of the present disclosure.

FIGS. 10A-10D are exemplary diagrams illustrating an exemplary signaling game. In the exemplary epistatic signaling game, each agent has ability to signal a subset of "attacks" as well as a subset of "checks." For each agent, a strategy is represented as a deterministic finite state automaton, which can evolve over time during a simulation via mutation. As an example, a sequence of four mutations with K=8 attack and defense possibilities is shown, with each attack and check vector in a state being denoted by a number in hexadecimal notation and a color gradient. As shown in FIG. 10A, the initial seed strategy employs no attacks and no defenses, the label 00.00 represents the selected attacks (e.g., two hexadecimal digits to the left) and selected defenses (e.g., two hexadecimal digits to the right), transitions (e.g., edges) in the FSA are coded, element 1005 can be used if the strategy detects an attack, and element 1010 (e.g., a transition) transition can be used otherwise. As shown in FIG. 10B, the sending signal is modified from 00 to d9 which encodes (e.g., in hexadecimal) the attack set $\{a_1, a_4, a_5, a_7, a_8\}$ as the new attack option. A gradient coloration from left to right is used to indicate the density of attacks and defenses employed in each state. FIG. 10C illustrates how mutation adds an additional state with random send option $\{a_2, a_8\}$ and receive option $\{c_4, c_7, c_8\}$ encoded as 82.c8. FIG. 10D illustrates that an additional state is added having label 4d.98, which can represent attack options $\{a_1, a_3, a_4, a_7\}$ and defense options $\{c_4, c_5, c_8\}$. In particular the options for a newly created state are selected uniformly randomly over the option spaces with $2^K$ possibilities.

FIGS. 11A-11D are further exemplary diagrams illustrating an exemplary signaling game. For example, FIGS. 11A-11D illustrate an example of an agent's evolution from FIGS. 10A-10D. These procedure are shown in FIG. 11A, which illustrates 10 sequences, FIG. 11B, which illustrates 100 sequences, FIG. 11C, which illustrates 1000 sequences and FIG. 11D, which illustrates 5000 sequences starting from the simplest single state strategy labeled 00.00. Mutation facilitates strategies to develop complex transitions based on detection (e.g., transitions 1105 or transition 1110 for applications against encountered agents in repeated games).

Exemplary Experimental Results.

Using shape parameters M=320, K=8, N=80,000 with system parameters D=10, E=100, F=4, G=2, H=2, μ=0.03, δ=0.5 and letting the exemplary encounter mechanism being random pairs α=0.0, experiments can be conducted by generating 100 histories of simulations of the following systems. Throughout the mutation type rates will remain fixed at: v=[0.15, 0.15, 0.1, 0.3, 0.3].

S1: Epistatic signaling games with receiver options mutated uniformly randomly over the option space.
S2: Epistatic signaling games with receiver options scored as a strong and transparent measure in the population ξ; =0.5.
S3: Epistatic signaling games with minority step function G(U) with τ=0.4, ζ4.5.
S4: Epistatic signaling games with receiver options scored as a strong and transparent measure in the population ξ=0.5, and minority step function G(U) with τ=0.4, ζ=4.5.

FIGS. 12A and 12B illustrate a single history of (S1), an epistatic signaling game, where receiver options can be mutated uniformly randomly over the option space. In particular, FIG. 12A illustrates fractional quantities of attacks, effective attacks, defenses and effective defenses in about 80,000 generations, while FIG. 12B illustrates, in higher resolution, these quantities in about 4,500 generations starting from generation offset about 22,000 from FIG. 12A. The exemplary quantities plotted are total attacks 1205, effective attacks 1210, total defenses 1215 and effective defenses 1220.

Figure 13A:
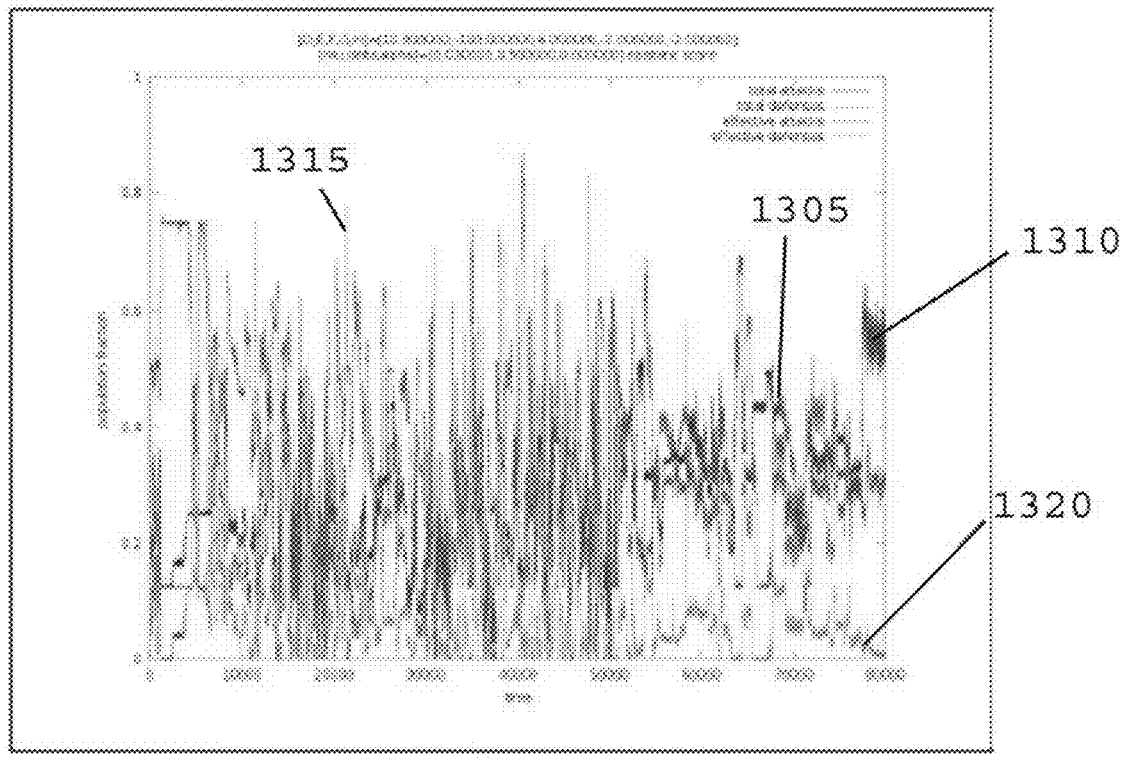
FIG. 13A is a further exemplary graph illustrating fractional quantities of attacks according to an exemplary embodiment of the present disclosure.
Figure 13B:
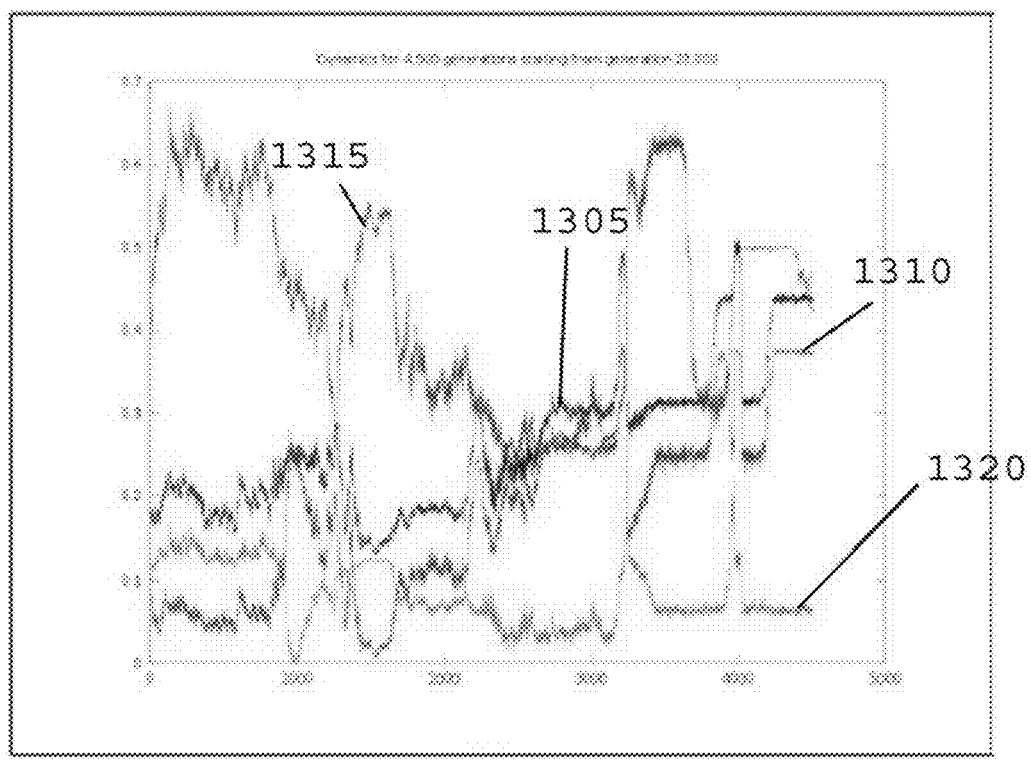
FIG. 13B is an exemplary graph illustrating higher resolution quantity attacks as compared to FIG. 13A according to an exemplary embodiment of the present disclosure.

FIGS. 13A and 13B illustrate a single history of (S2), an epistatic signal game where receiver options are scored as a strong and transparent measure for selection in the population (e.g., ξ=0.5). Dynamics of epistatic signaling games when the mutation for receiver options can be biased toward strong and transparent performance measures proven in previous rounds against employed attacks. FIG. 13A illustrates fractional quantities of attacks, effective attacks, defenses, and effective defenses in about 80,000 generations, while FIG. 13B illustrates in higher resolution these quantities in about 4,500 generations starting from generation offset about 22.000 from FIG. 13A. The quantities plotted are total attacks 1305, effective attacks 1310, total defenses 1315 and effective defenses 1320.

FIGS. 14A and 14B illustrate a single history of (S4), an epistatic signaling game where receiver options are scored as a strong and transparent measure for selection in the population (e.g., ξ=0.5), and minority step function G(U) with τ=0.4, ζ=4.5. Dynamics of epistatic signaling games when the mutation for receiver options is biased toward strong and transparent performance measures and minority step function G(U) can be used to determine the cost of applying each defense. FIG. 14A illustrates fractional quantities of attacks, effective attacks, defenses and effective defenses in about 80,000 generations, while FIG. 14G illustrates in higher resolution these quantities in about 4,500 generations starting from generation offset about 22,000 from FIG. 14A. The quantities plotted are total attacks 1405, effective attacks 1410, total defenses 1415 and effective defenses 1420.

Figure 15:
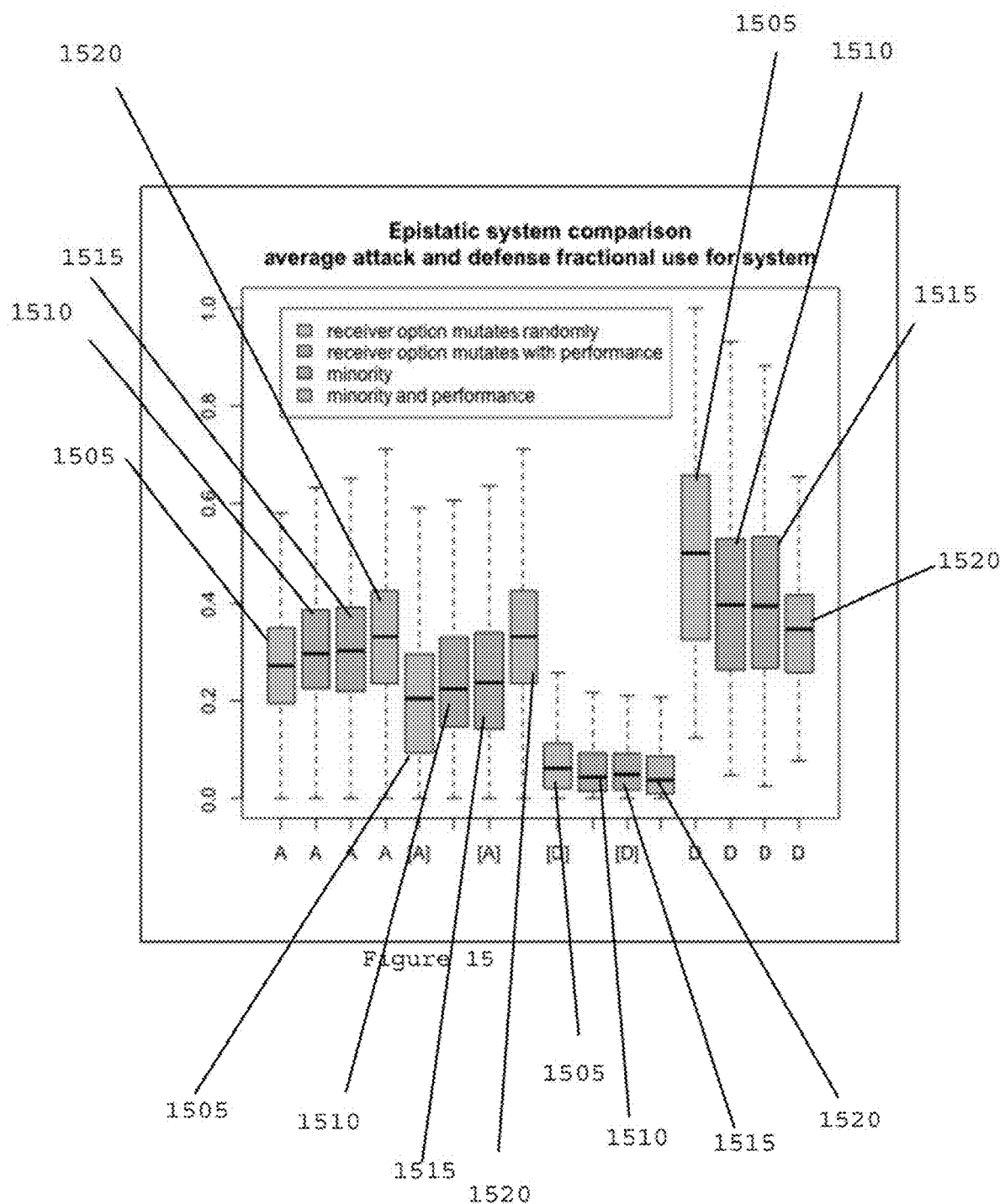
FIG. 15 is an exemplary graph illustrating the dynamics of epistatic signal games in behavioral quantities according to an exemplary embodiment of the present disclosure.

FIG. 15 illustrates a comparison of the behavior of each system (e.g., receiver option mutates randomly 1505, receiver option mutates with performance 1510, minority 1515 and minority and performance 1520) using the quantities which measure the fraction of all attacks sent (e.g., of the total possible capacity of users to attack) as A, the fraction of attacks that may not be detected as [A], the fraction of defenses which detect attacks as [D], and the fraction of defenses fielded (e.g., of the total possible capacity of users to field defenses) as D.

The effect of strong and transparent measures for challenge options appears not to decrease the number of attacks, but does seem to reduce both the number of defenses fielded, while maintaining an equivalent detection rate. The effects of minority games, which introduce a multiplier cost to G, the cost of fielding defenses seems to also have an equivalent effect to that of imposing strong and transparent measures on the receiver options. The combination of using both seems to have compounding effects.

Figure 16:
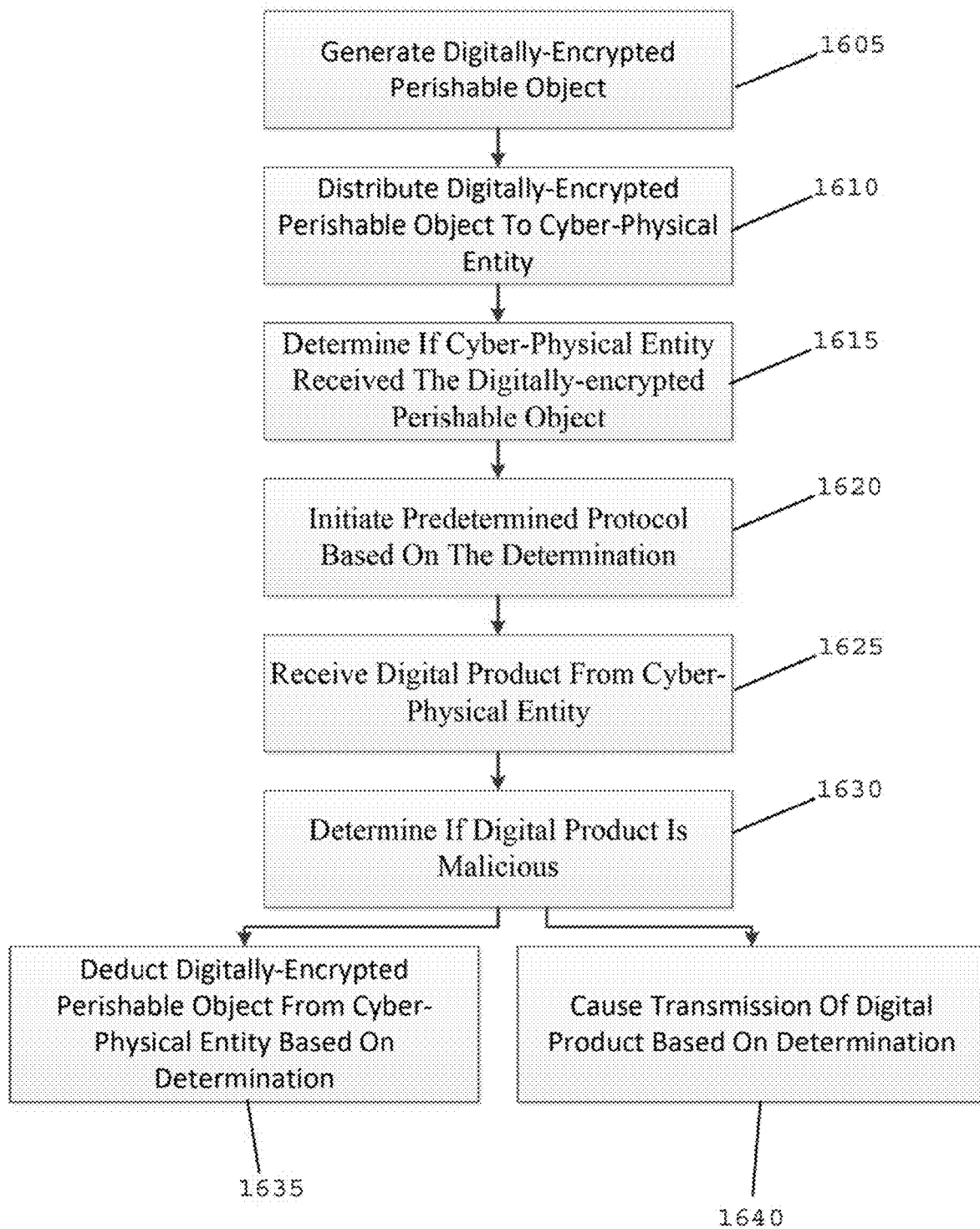
FIG. 16 is a flow diagram of an exemplary method for initiating a protocol according to an exemplary embodiment of the present disclosure.

FIG. 16 shows a flow diagram of an exemplary method for initiating a protocol according to an exemplary embodiment of the present disclosure, which can be implemented by a computer arrangement (e.g., a computer processor) specifically configured and/or programmed to execute the exemplary procedures described herein. For example, at procedure 1605, one or more digitally-encrypted perishable objects can be generated, which can be distributed to a cyber-physical entity at procedure 1610. At procedure 1615, a determination can be made as to whether the cyber-physical entity received the digitally-encrypted perishable object. At procedure 1620, a protocol can be initiated based on the determination. Additionally, at procedure 1625, a digital product can be received, and a determination can be made, at procedure 1630, as to whether the digital product is malicious. If the digital product is malicious, then one or more of the digitally-encrypted perishable objects can be deducted from the cyber-physical entity at procedure 1635. If the digital product is not determined to be malicious, then a transmission of the digital product can occur at procedure 1640.

Figure 17:
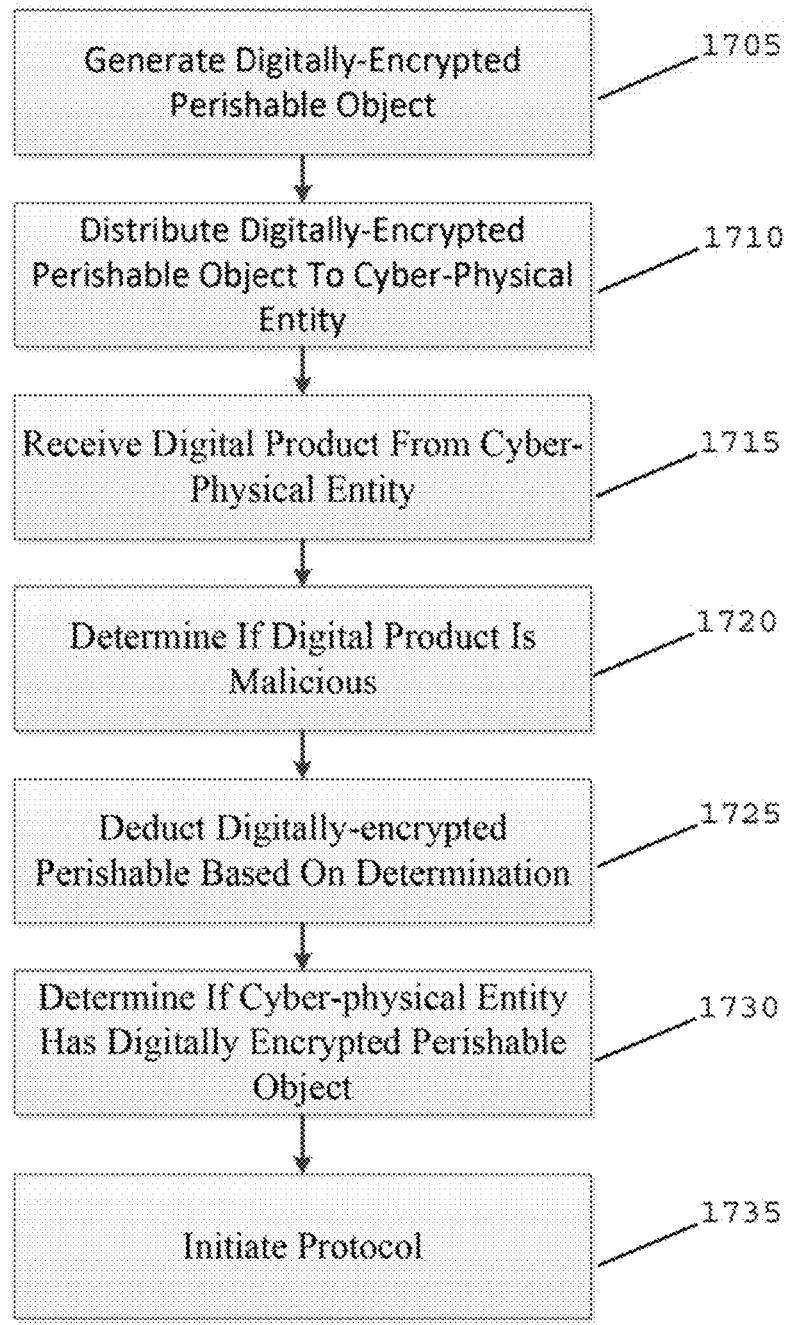
FIG. 17 is a flow diagram of the exemplary method for initiating the protocol according to another exemplary embodiment of the present disclosure.

FIG. 17 shows a flow diagram of the method for initiating the protocol according to another exemplary embodiment of the present disclosure, which can be implemented by the computer arrangement (e.g., the computer processor) specifically configured and/or programmed to execute the exemplary procedures described herein. For example, at procedure 1705, one or more digitally-encrypted perishable objects can be generated, which can be distributed to a cyber-physical entity at procedure 1710. At procedure 1715, a digital product can be received from the cyber-physical entity. A determination can be made as to whether the digital product is malicious at procedure 1720, and one or more of the digitally-encrypted perishable objects can be deducted from the cyber-physical entity at procedure 1725 if the digital product is determined to be malicious. At procedure 1730, a determination can be made as to whether the cyber-physical entity still has any digitally-encrypted perishable objects. If it does, then a protocol can be initiated at procedure 1735.

Figure 18:
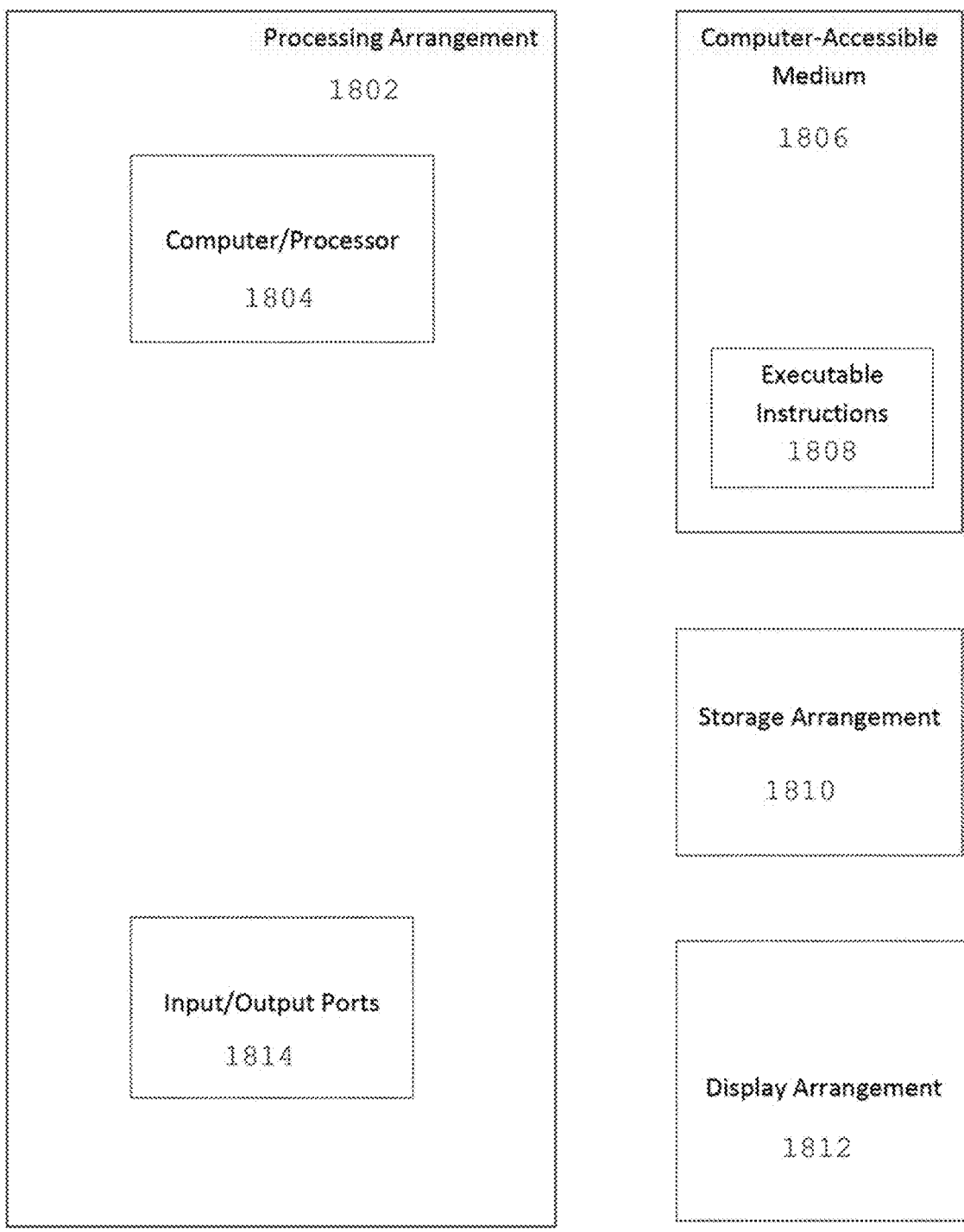
FIG. 18 is an illustration of an exemplary block diagram of an exemplary system in accordance with certain exemplary embodiments of the present disclosure.

FIG. 18 shows a block diagram of an exemplary embodiment of a system according to the present disclosure. For example, exemplary procedures in accordance with the present disclosure described herein can be performed by a processing arrangement and/or a computing arrangement 1802. Such processing/computing arrangement 1802 can be, for example entirely or a part of, or include, but not limited to, a computer/processor 1804 that can include, for example one or more microprocessors, and use instructions stored on a computer-accessible medium (e.g., RAM, ROM, hard drive, or other storage device).

As shown in FIG. 18, for example a computer-accessible medium 1806 (e.g., as described herein above, a storage device such as a hard disk, floppy disk, memory stick, CD-ROM, RAM, ROM, etc., or a collection thereof) can be provided (e.g., in communication with the processing arrangement 1802). The computer-accessible medium 1806 can contain executable instructions 1808 thereon. In addition or alternatively, a storage arrangement 1810 can be provided separately from the computer-accessible medium 1806, which can provide the instructions to the processing arrangement 1802 so as to configure the processing arrangement to execute certain exemplary procedures, processes and methods, as described herein above, for example.

Further, the exemplary processing arrangement 1802 can be provided with or include an input/output arrangement 1814, which can include, for example a wired network, a wireless network, the internet, an intranet, a data collection probe, a sensor, etc. As shown in FIG. 18, the exemplary processing arrangement 1802 can be in communication with an exemplary display arrangement 1812, which, according to certain exemplary embodiments of the present disclosure, can be a touch-screen configured for inputting information to the processing arrangement in addition to outputting information from the processing arrangement, for example. Further, the exemplary display 1812 and/or a storage arrangement 1810 can be used to display and/or store data in a user-accessible format and/or user-readable format.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures which, although not explicitly shown or described herein, embody the principles of the disclosure and can be thus within the spirit and scope of the disclosure. Various different exemplary embodiments can be used together with one another, as well as interchangeably therewith, as should be understood by those having ordinary skill in the art. In addition, certain terms used in the present disclosure, including the specification, drawings and claims thereof, can be used synonymously in certain instances, including, but not limited to, for example, data and information. It should be understood that, while these words, and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

EXEMPLARY REFERENCES

The following references are hereby incorporated by reference in their entirety.

[1] M. Kassner, "Android flashlight app tracks users via gps, ftc says hold on," Dec. 11, 2013, [Online: posted Dec. 11, 2013, 9:49 PM PST]. [Online]. Available: http://www-.techrepublic.com/bloglit-security/why-does-an-android-flashlight-app-need-gps-permission/

[2] W. Casey, J. A. Morales, T. Nguyen, J. Spring, R. Weaver, E. Wright, L. Metcalf, and B. Mishra, "Cyber security via signaling games: Toward a science of cyber security,'" in ICDCIT, ser. Lecture Notes in Computer Science, R. Natarajan, Ed. vol. 8337. Springer, 2014, pp. 34-42.

[3] Mitre, Science of Cyber-security. JASON, MITRE Corporation, 2010. [Online]. Available: http://fas.org/irp/agency/dod/jasoncyber.pdf

[4] M. R. Clarkson and F. B. Schneider, "Hyperproperties," Journal of Computer Security, vol. 18, no. 6, pp. 1157-1210, 2010.

[5] R. Moskovitch, D. Stope!, C. Feher, N. Nissim, and Y. Elovici, "Unknown malcode detection via text categorization and the imbalance problem," in ISI. IEEE, 2008, pp. 156-161.

[6] R. Tian, R. Islam, L. Batten, and S. Versteeg, "Differentiating malware from cleanware using behavioural analysis," in Proceedings of the 5rd International Conference on Malicious and Unwanted Software: MALWARE 2010, 2010.

[7] A. Alrawi, "Unveiling zeus: Automated classification of malware samples," in Proceedings of the 22nd International Conference on World Wide Web Companion. ser. WWW '13 Companion. Republic and Canton of Geneva, Switzerland: International World Wide Web Conferences Steering Committee, 2013, pp. 829-832. [Online]. Available: http://dl.acm.org/citation.cfm?id=2487788.2488056

[8] V. Moonsamy, R. Tian, and L. Batten, "Feature reduction to speed up malware classification," in Proceedings of the 16th Nordic Conference on Information Security Technology for Applications, ser. NordSec' 11. Berlin, Heidelberg: Springer-Verlag, 2012, pp. 176-188.

[9] E. Gandotra. D. Bansal, and S. Sofat, "Malware analysis and classification: A survey," Journal of Information Security, vol. 2014, 2014.

[10] J. R. Quinlan, "Induction of decision trees," Mach. Learn., vol. I, no. I. pp. 81-106, March 1986. [Online]. Available: http:/ldx.doi.org/10.1023/A:1022643204877

[11] - - - , C4.5: programs for machine teaming. Morgan kaufmann, 1993, vol. 1.

[12] T. Hastie, R. Tibshirani, and J. Friedman, The elements of statistical learning: data mining, inference and prediction, 2nd ed. Springer, 2009. [Online] Available: http://www-stat.stanford.edu/tibs/ElemStatLearn/

[13] L. Breiman, "Random forests," Machine teaming, vol. 45, no. I, pp. 5-32, 2001.

[14] C.-K. Luk, R. Cohn, R. Muth, H. Patil, A. Klauser, G. Lowney, S. Wallace, V. J. Reddi, and K. Hazelwood. "Pin: building customized program analysis tools with dynamic instrumentation," ACM Sigplan Notices, vol. 40, no. 6, pp. 190-200, 2005.

[15] H. Nayyar and P. Bueno, "Clash of the Titans: ZeuS v SpyEye," 2010. [Online]. Available: http://www.sans.org/reading-room/whitepapers/malicious/clash-titans-zeus-spyeye-33393

[16] T. Ormerod, L. Wang, M. Debbabi. A. Youssef, H. Binsalleeh, A. Boukhtouta, and P. Sinha, "Defaming botnet toolkits: A bottom-up approach to mitigating the threat," in Proceedings of the 2010 Fourth International Conference on Emerging Security Information. Systems and Technologies, ser. SECURWARE '10. Washington, D.C., USA: IEEE Computer Society, 2010, pp. 195-200. [Online]. Available: http://dx.doi.org/IO.1109/SECURWARE.2010.39

[17] H. Binsalleeh, T. Ormerod, A. Boukhtouta, P. Sinha, A. M. Youssef, M. Debbabi, and L. Wang, "On the analysis of the zeus botnet crimeware toolkit," in PST, 2010, pp. 31-38.

[18] N. Falliere, "Windows anti-debug reference," Retrieved October, vol. I, p. 2007. 2007.

[19] W. Casey and A. Shehnire, "Signature Limits: An Entire Map of Clone Features and their Discovery in Nearly Linear Time," ArXiv e-prims, July 2014.

[20] contagio. (2014) contagio malware dump. [Online]. Available: http://contagiodump.blogspot.com/

[21] M. Hall, E. Frank, G. Holmes, B. Pfahlinger, P. Reutemann, and I. H. Witten, "The weka data mining software: An update," SJGKDD Explor. Newsl., vol. II, no. I, pp. 10-18, November 2009. [Online]. Available: httpil-doi.acm.org/10.114511656274.1656278.

What is claimed is:

1. A non-transitory computer-accessible medium having stored thereon computer-executable instructions for initiating at least one protocol, wherein, when a computer arrangement executes the instructions, the computer arrangement is configured to perform procedures comprising:
   a. verifying that at least one cyber-physical entity is not malicious using trace data related to the at least one cyber-physical entity, wherein the trace data includes observable events associated with kernel functions of the at least one cyber-physical entity;
   b. receiving a plurality of digitally encrypted currency;
   c. distributing the plurality of digitally encrypted currency to the at least one cyber-physical entity;
   d. determining if the at least one cyber physical entity received the plurality of digitally encrypted currency;
   e. deducting a particular amount of the plurality of digitally encrypted currency from the at least one cyber-physical entity; and
   f. causing a transmission of at least one digital product by the at least one cyber-physical entity over a network based on the determination.

2. The non transitory computer-accessible medium of claim 1, wherein the at least one cyber-physical entity includes a software provider.

3. The non-transitory computer-accessible medium of claim 1, wherein the computer arrangement is further configured to receive the at least one digital product from the at least one cyber-physical entity.

4. The non-transitory computer-accessible medium of claim 1, wherein the at least one digital product is a software program.

5. The non-transitory computer-accessible medium of claim 1, wherein the computer arrangement is further configured to determine if the at least one digital product is malicious.

6. The non-transitory computer-accessible medium of claim 5, wherein the computer arrangement is further configured to deduct the particular amount of the plurality of digitally encrypted currency from the at least one cyber physical entity if the at least one digital product is digitally determined to be malicious.

7. The non-transitory computer-accessible medium of claim 1, wherein the computer arrangement is further configured to:
   receive an indication that the at least one digital product is determined to be malicious; and deduct the particular amount of the plurality of digitally encrypted currency from the at least one cyber-physical entity based on the indication.

8. The non-transitory computer-accessible medium of claim 1, wherein the computer arrangement is further configured to:
receive the at least one digital product from the at least one cyber-physical entity;
at least one of (i) determine if the at least one digital product is malicious or (ii) receive an indication that the at least one digital product is malicious; and
deduct the particular amount of the plurality of digitally encrypted currency from the at least one cyber-physical entity based on at least one of the determination or the receipt of the indication.

9. A method for initiating at least one protocol, comprising:
a. verifying that at least one cyber-physical entity is not malicious using trace data related to the at least one cyber-physical entity, wherein the trace data includes observable events associated with kernel functions of the at least one cyber-physical entity;
b. receiving a plurality of digitally encrypted currency;
c. distributing the plurality of digitally encrypted currency to the at least one cyber-physical entity;
d. determining if the at least one cyber-physical entity received the at least one digitally encrypted perishable object;
e. deducting a particular amount of the plurality of digitally encrypted currency from the at least one cyber-physical entity; and
f. using a computer hardware arrangement, causing a transmission of at least one digital product by the at least one cyber-physical entity over a network based on the determination.

10. A system for initiating at least one protocol, comprising:
a computer arrangement configured to:
a. verify that at least one cyber-physical entity is not malicious using trace data related to the at least one cyber-physical entity, wherein the trace data includes observable events associated with kernel functions of the at least one cyber-physical entity;
b. receiving a plurality of digitally encrypted currency;
c. distribute the plurality of digitally encrypted currency to the at least one cyber-physical entity;
d. determine if the at least one cyber-physical entity received the plurality of digitally encrypted currency;
e. deduct a particular amount of the plurality of digitally encrypted currency from the at least one cyber-physical entity; and
f. cause a transmission of at least one digital product by the at least one cyber-physical entity over a network based on the determination.

11. A non-transitory computer-accessible medium having stored thereon computer-executable instructions for initiating at least one protocol, wherein, when a computer arrangement executes the instructions, the computer arrangement is configured to perform procedures comprising:
a. verifying that at least one cyber physical entity is not malicious using trace data related to the at least one cyber-physical entity; wherein the trace data includes observable events associated with kernel functions of the at least one cyber-physical entity;
b. receiving a plurality of digitally encrypted currency;
c. distributing the plurality of digitally encrypted currency to the at least one cyber-physical entity;
d. receiving at least one digital product from the at least one cyber physical entity;
e. determining if the at least one digital product is malicious;
f. deducting a particular amount of the plurality of digitally encrypted currency from the at least one cyber-physical entity if the at least one digital product is determined to be malicious;
g. determining if the at least one cyber-physical entity has any of the plurality of digitally encrypted currency remaining; and
h. causing a transmission of at least one digital product by the at least one cyber-physical entity over a network if the at least one cyber-physical entity still has any of the plurality of digitally encrypted currency remaining.

12. The non-transitory computer-accessible medium of claim 11, wherein the at least one cyber-physical entity includes a software provider.

13. The non-transitory computer-accessible medium of claim 11, wherein the at least one digital product is a software program.

14. The non-transitory computer-accessible medium of claim 11, wherein the computer arrangement is further configured to deduct the particular amount of the plurality of digitally encrypted currency from the at least one cyber-physical entity if the at least one digital product is digitally determined to be malicious.

15. A method for initiating at least one protocol, comprising:
a. verifying that at least one cyber-physical entity is not malicious using trace data related to the at least one cyber-physical entity, wherein the trace data includes observable events associated with kernel functions of the at least one cyber-physical entity;
b. receiving a plurality of digitally encrypted currency;
c. distributing the plurality of digitally encrypted currency to the at least one cyber-physical entity;
d. receiving at least one digital product from the at least one cyber-physical entity;
e. determining if the at least one digital product is malicious;
f. deducting a particular amount of the plurality of digitally encrypted currency from the at least one cyber-physical entity if the at least one digital product is determined to be malicious;
g. determining if the at least one cyber-physical entity has any of the plurality of digitally encrypted currency remaining; and
h. using a computer hardware arrangement, causing a transmission of at least one digital product by the at least one cyber-physical entity over a network if the at least one cyber-physical entity still has any of the digitally encrypted currency remaining.

16. A system for initiating at least one protocol, comprising:
a computer arrangement configured to:
a. verify that at least one cyber-physical entity is not malicious using trace data related to the at least one cyber-physical entity, wherein the trace data includes observable events associated with kernel functions of the at least one cyber-physical entity;
b. receive a plurality of digitally encrypted currency;
c. distribute the plurality of digitally encrypted currency to the at least one cyber-physical entity;

d. receive at least one digital product from the at least one cyber-physical entity;
e. determine if the at least one digital product is malicious;
f. deduct a particular amount of the plurality of digitally encrypted currency from the at least one cyber-physical entity if the at least one digital product is determined to be malicious;
g. determine if the at least one cyber-physical entity has any of the plurality of digitally encrypted currency remaining; and
h. cause a transmission of at least one digital product by the at least one cyber-physical entity over a network if the at least one cyber-physical entity still has any of the digitally encrypted currency remaining.

* * * * *